(12) United States Patent
Terada et al.

(10) Patent No.: US 6,491,733 B2
(45) Date of Patent: Dec. 10, 2002

(54) APPARATUS FOR MANUFACTURING SOLID ELECTROLYTIC CAPACITOR

(75) Inventors: Mitsuo Terada, Kyoto (JP); Motonobu Ueno, Joyo (JP); Masaki Shiragami, Uji (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 0 days.

(21) Appl. No.: 09/768,225

(22) Filed: Jan. 25, 2001

(65) Prior Publication Data

US 2001/0011635 A1 Aug. 9, 2001

(30) Foreign Application Priority Data

Jan. 28, 2000 (JP) .................................. 2000-019816
Jan. 28, 2000 (JP) .................................. 2000-019817

(51) Int. Cl.$^7$ ................................................ H01G 9/00
(52) U.S. Cl. ................................................ 29/25.03
(58) Field of Search ......................... 438/14; 29/25.03, 29/25.01; 361/234

(56) References Cited

U.S. PATENT DOCUMENTS 5,454,147 A * 10/1995 Kobayashi .................. 29/25.03
6,168,639 B1 * 1/2001 Taketani ..................... 29/25.03

* cited by examiner

Primary Examiner—John F. Niebling
Assistant Examiner—Andre C Stevenson
(74) Attorney, Agent, or Firm—Wenderoth, Lind & Ponack, L.L.P.

(57) ABSTRACT

An apparatus for manufacturing a solid electrolytic capacitor includes an anodization part, a polymerization part, a cathode layer formation part, an assembly part, and a molding part. The polymerization part includes a plurality of polymerization baths of a substantially same structure and a conveyance mechanism. In addition the plurality of polymerization baths are placed around the conveyance mechanism within a conveyance range.

19 Claims, 16 Drawing Sheets

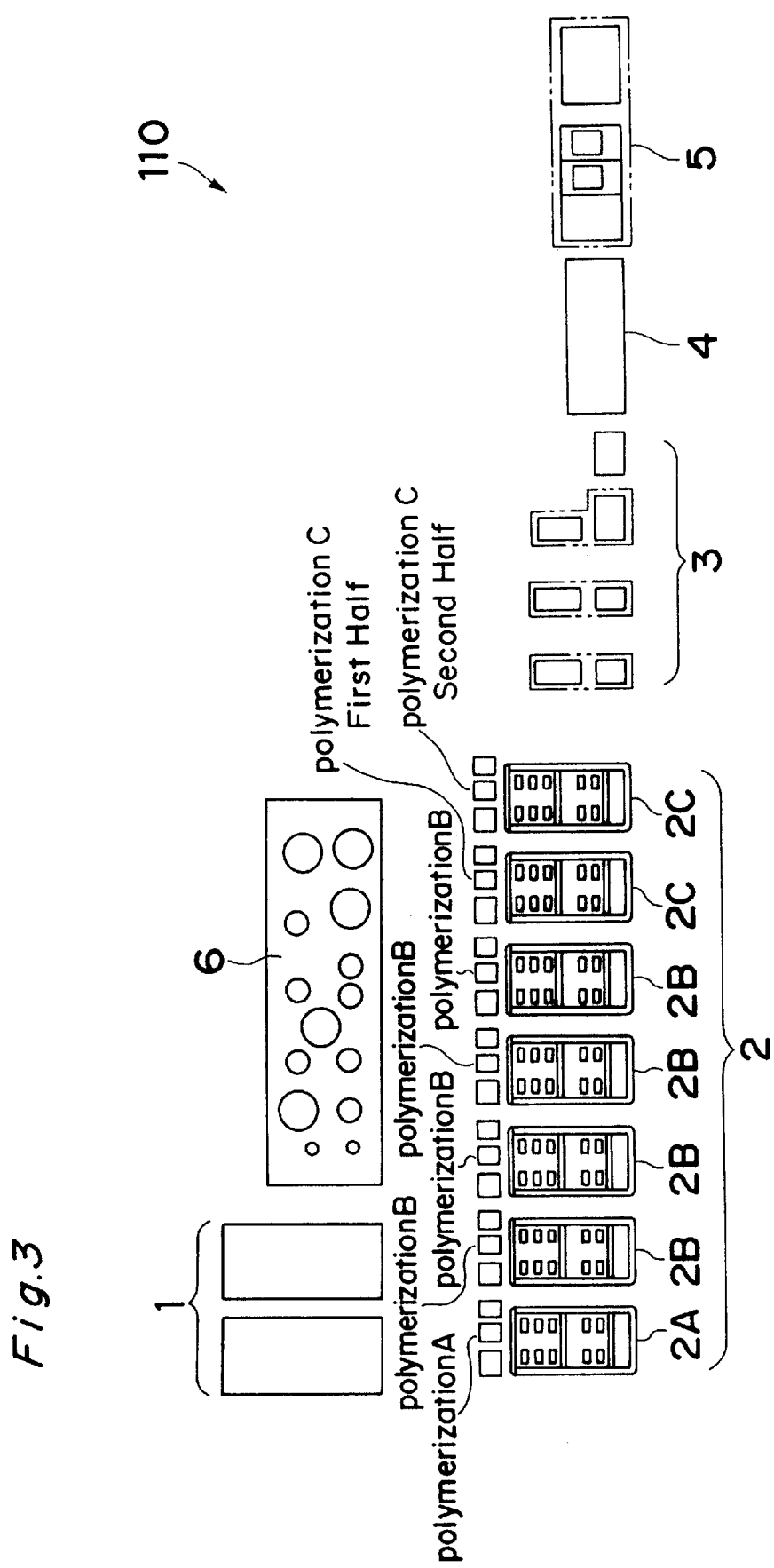

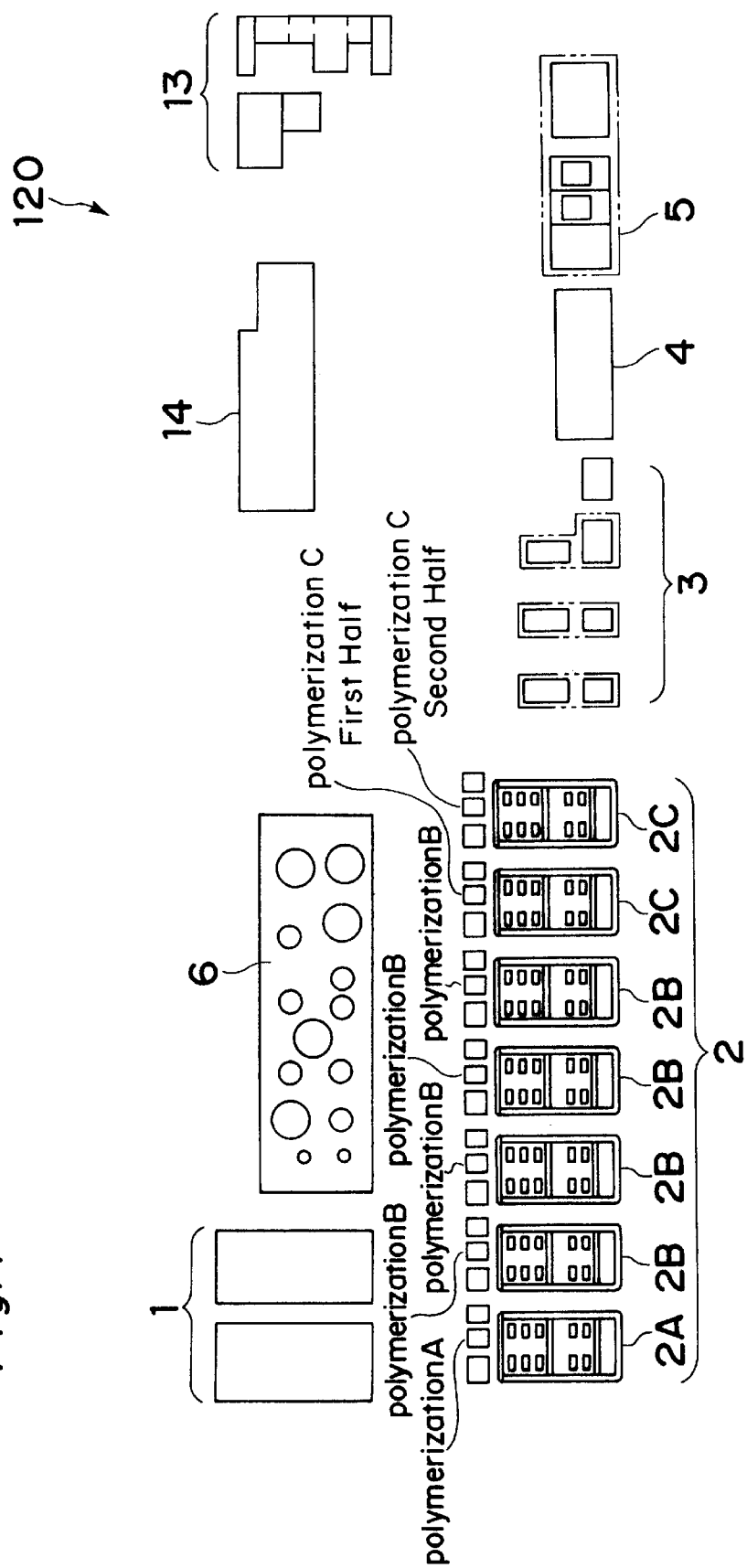

APPARATUS FOR MANUFACTURING SOLID ELECTROLYTIC CAPACITOR

BACKGROUND OF THE INVENTION

1. Field of the Invention

The present invention relates an apparatus for manufacturing a solid electrolytic capacitor particularly of a kind having a solid electrolytic layer made of an electroconductive polymer.

2. Description of the Related Art

In recent years, rapid progress has been made in high-speed digital signal processing and multimedia appliances have come to have a high-speed feature along with a compact size. The need has incidentally increased to use downsized and flattened power supplies for high-frequency driving and, therefore, stabilization and noise reduction have now come to be an important factor. Under these circumstances, a solid electrolytic capacitor, an important circuit component part, is desired to have a low ESR (equivalence series resistance) so that it can adapt to a rapid change in voltage, and also to have a compact size and a large capacity so that it can be surface mounted.

A solid electrolytic capacitor of a kind having a solid electrolytic layer made of an electroconductive polymer can meet the requirement. Hereinafter, the solid electrolytic capacitor will be discussed.

FIG. 12A illustrates a sectional representation of the standard solid electrolytic capacitor 60. The solid electrolytic capacitor 60 includes a capacitor element 45 embedded in a covering resin 49 with respective portions of anode and cathode terminals 46 and 47 exposed to the outside thereof.

The capacitor element 45 is made up of a porous anode element 40, a dielectric oxide film 42 formed on a surface of the anode element 40, a solid electrolytic layer 43 formed over the dielectric oxide film 42 and a cathode layer 44 formed over the solid electrolytic layer 43. FIG. 12B is a fragmentary enlarged diagram showing the anode element 40. The porous anode element 40 has a plurality of micropores 62 on its surface as shown in FIG. 12B.

The porous anode element 40 is obtained by pressing a powder of a valve action metal, for example, tantalum to a desired shape and then sintering it, and the anode element 40 has embedded therein an anode lead line 41 in the form of a tantalum wire with a portion of the anode lead line exposed to the outside. The anode lead line 41 is connected with the anode terminal 46. The dielectric oxide film 42 is obtained by anodizing the surface of the anode element 40. The solid electrolytic layer 43 is made of an electroconductive polymer such as polypyrrole. The anode terminal 46 is connected with the anode lead line 41 by welding and the cathode terminal 47 is connected with the cathode layer 44 by the use of an electroconductive bonding agent 48. The exposed portions of the anode and cathode terminals 46 and 47 are bent inwardly so that the capacitor 60 can be surface-mountable as a capacitor chip on a planar support surface.

A method of manufacturing the solid electrolytic capacitor 60 will be discussed with reference to a flowchart of FIG. 13 showing the sequence of making the solid electrolytic capacitor 60 according to the prior art.

As shown therein the tantalum metal powder with the anode lead line 41 embedded therein is pressed to a desired shape and is then sintered to provide the porous anode element 40(Shaping and Sintering Step).

Subsequently, using a phosphoric acid, the anode element 40 is anodized to form the dielectric oxide film 42 on an outer surface of the anode element 40(Anodizing Step).

After the anode element 40 has been impregnated with a pyrrole monomer solution, the anode element 40 is dipped into a solution with an oxidizing agent, or after the anode element 40 has been dipped into the solution with the oxidizing agent, the anode element 40 is impregnated with a pyrrole monomer solution and the solid electrolytic layer 43 is formed over the dielectric oxide film 42 by means of a chemical oxidation polymerization(Polymerization Step).

Thereafter, carbon is coated, a silver paint is coated and drying is performed to complete formation of the cathode layer 44, thereby completing the capacitor element 45(Cathode Forming Step).

Then, the anode lead line 41 extending from the capacitor element 45 is welded to the anode terminal 46 of a lead frame and the cathode layer 44 is connected with the cathode terminal 47 by the use of an electroconductive bonding agent 48(Fabrication Step). The capacitor element 45 is thereafter resin-molded in an epoxy covering resin 49 with respective portions of the anode and cathode terminals 46 and 47 exposed to the outside of the covering resin 49(Resin-encasing Step). In general, by the sequence discussed above, a batch of capacitors 60 are manufactured at a time with the anode and cathode terminals 46 and 47 of one capacitor 60 continuous with those of the next adjacent capacitor 60. Accordingly, as a final step, the capacitors 60 connected together are separated into the individual capacitors 60 which are subsequently tested to provide the individual solid electrolytic capacitors 60(Finishing Step).

FIG. 14 shows a schematic layout of a portion of the capacitor manufacturing apparatus where polymerization is carried out, and FIG. 15 is a fragmentary enlarged perspective view of the polymerization part of FIG. 14. As shown in FIG. 14, the polymerization part includes one first array of baths 50 and 50A, four second arrays of baths 50 and 50A, and two third arrays of baths 50 and 50A, and these first, second, and third arrays are arranged in parallel. These arrays include a plurality of polymerization baths 50, and baths 50A for cleansing, drying, and so on. The first array is a polymerization (A) process line for forming the solid electrolytic layer 43 made of polypyrrole on an outer surface 63 (FIG. 12B) of the anode element 40 (that is, the surface except for the micropores 62 of the anode element 40) by means of a chemical oxidation polymerization. The second lines are polymerization (B) process lines for forming the solid electrolytic layer 43 made of polypyrrole within the micropores of the anode element 40 by means of a chemical oxidation polymerization. The third lines are polymerization (C) process lines for forming the solid electrolytic layer 43 made of an electroconductive polymer such as polythiophene, which is different from polypyrrole, by means of a chemical oxidation polymerization.

Each of the first, second, and third lines includes a plurality of polymerization baths 50 as shown in FIG. 14. As shown in FIGS. 14 and 15, the polymerization baths 50 are arranged in line and connected, and a conveyance between the baths was performed manually by an attendant worker 61.

It is difficult to form the solid electrolytic layer 43 within the micropores 62 as well as on the outer surface 63 of the anode element 40, and the solid electrolytic layer 43 having a desired thickness cannot be formed by one polymerization step. Accordingly, since each of the processes is required to be repeated several ten times, a considerably complex process such as 3 repetitions of the polymerization process A and 14 repetitions of the polymerization process B for each of the 4 lines, has been required.

FIGS. 16A and 16B are a plan view and a sectional view, respectively, of the polymerization bath 50 which is used for a chemical oxidation polymerization in the polymerization process. In FIG. 16A, the polymerization bath 50 has an open-topped cavity 64, a supply passage 51 for supplying the cavity 64 with a polymerization solution 54 from a tank (not shown) of the polymerization solution 54, the supply passage 51 being defined at a center of the bottom surface of the cavity 64 and communicated with the cavity 64, weir boards 52A and 52B which are placed in the cavity 64, and waste liquid tubes 53A and 53B for draining an overflow of the polymerization solution 54 over the weir boards 52A and 52B.

Hereinafter, an operation of the polymerization bath 50 will be described. At first, the polymerization solution 54 is supplied from the solution tank (not shown) into the cavity 64 through the supply passage 51 so as to fill the cavity 64 with the polymerization solution 54. The polymerization solution 54 which is supplied to the cavity 64 in an amount greater than a predetermined amount overflows the weir boards 52A and 52B and is then drained out of the cavity 64.

However, the conventional apparatus for manufacturing the solid electrolytic capacitor above has the following problems.

In the first place, the conventional apparatus makes use of a belt-type conveyor for successively transporting pallets linearly at the polymerization station where complicated and laborious polymerization processes are performed and, therefore, the apparatus is bulky having a substantial length and expensive to manufacture while requiring a relatively large space for installation.

Secondly, in the case where an accident happens in the subsequent processes halfway, all of the lines have to be brought to a halt, resulting in reduction in operation rate which would in turn result in defective products. Accordingly, the productivity is considerably reduced.

Finally, since the polymerization solution 54 bubbles in the cavity 64 during the filling of the bath 50 with the polymerization solution 54, the bubbles adversely affect the polymerization process, resulting in a non-uniform formation of the solid electrolytic layer 43. In order to prevent the occurrence of the bubbles, it was proposed to reduce the speed for supplying the polymerization solution 54 into the cavity 64. This, however, makes an operating efficiency considerably lower, and it is still difficult to completely avoid the occurrence of the bubbles even though the supplying speed of the polymerization solution 54 is reduced. In addition, since the polymerization solution 54 circulates unevenly within the cavity 64, it is difficult to control the surface level and the temperature of the polymerization solution 54, resulting that the polymerization process is also adversely affected and the solid electrolytic layer 43 cannot be uniformly formed.

SUMMARY OF THE INVENTION

In view of the foregoing numerous problems, the present invention has been devised to eliminate the foregoing problems and is to provide an apparatus for manufacturing a solid electrolytic capacitor, which is compact in size and which is effective to prevent a production of defective products and to exhibit an excellent productivity with a low cost owing to the use of a polymerization bath which is effective to prevent an occurrence of bubbles and in which the surface level and the temperature of the polymerization solution can easily be controlled while allowing a solid electrolytic layer to be formed uniformly.

According to one aspect of the invention, an apparatus for manufacturing a solid electrolytic capacitor includes: (1) an anodization part for forming a dielectric oxide film on a surface of a porous anode element made of a valve action metal, the anode element having embedded therein an anode lead line with one end portion of the anode lead line exposed to an outside; (2) a polymerization part for forming a solid electrolytic layer made of an electroconductive polymer on the dielectric oxide film by a chemical oxidation polymerization, and comprising a plurality of polymerization baths of a substantially same structure, and a conveyance mechanism, wherein the plurality of polymerization baths are placed around the conveyance mechanism within a conveyance range; (3) a cathode layer formation part for forming a cathode layer on the solid electrolytic layer and providing a capacitor element; (4) an assembly part for connecting the anode lead line with an anode terminal and connecting the cathode lead line with a cathode terminal, the anode and cathode terminals being for connecting with an outer circuit; and (5) a molding part for covering the capacitor element with a covering resin with respective portions of the anode and cathode terminals exposed to an outside.

According to the above manufacturing apparatus, since the polymerization part has the plurality of polymerization baths of the substantially same structure, and the conveyance mechanism, and the plurality of polymerization baths are placed around the conveyance mechanism within a conveyance range, the manufacturing apparatus can be assembled compactly with the polymerization part unitized together with the constituent baths. In addition, since each of the plurality of the polymerization baths can be independent, all lines of the production processes do not have to be halted even if an accident happens in a subsequent production process halfway, making it possible to improve an operation rate, yield, and productivity.

According to another aspect of the invention, at least one of the polymerization baths includes: a first open-topped cavity to be filled with a polymerization solution; a supply passage for supplying the first open-topped cavity with the polymerization solution, the supply passage being located at one end of a bottom surface of the first open-topped cavity and communicated with the first open-topped cavity; an interruptible jet plate for preventing a jet flow of the polymerization solution supplied through the supply passage, and the interruptible jet plate being located adjacent to a connection part of the supply passage and the first open-topped cavity; a guide plate for restraining a rise of a level of the polymerization solution which is supplied to the first open-topped cavity via the interruptible jet plate, and the guide plate being located from one end of the first open-topped cavity adjacent to the interruptible jet plate to a substantially center position of the first open-topped cavity; and a level controlling mechanism for controlling the level of the polymerization solution supplied into the first open-topped cavity at a predetermined amount.

According to the above manufacturing apparatus, since the polymerization bath has the above-described interruptible jet plate and guide plate, it is possible to prevent an occurrence of the bubbles in the polymerization solution during when the cavity of the bath is supplied with the polymerization solution. Accordingly, the cavity can be filled with the polymerization solution while the polymerization solution is prevented from bubbling and the level of the polymerization solution 21 is continuously controlled precisely, and hence, the operation efficiency can be improved and the solid electrolytic layer can be uniformly formed.

BRIEF DESCRIPTION OF THE DRAWINGS

The present invention will become readily understood from the following description of preferred embodiments thereof made with reference to the accompanying drawings, in which like parts are designated by like reference numeral and in which:

FIG. 3 is a schematic illustration showing a layout of the apparatus according to a second embodiment of the present invention;

FIG. 4 is a schematic illustration showing a layout of the apparatus according to a third embodiment of the present invention;

DESCRIPTION OF THE EMBODIMENTS

This application is based on application Nos. 2000-19816and 2000-19817filed in Japan, the content of which is incorporated herein by reference.

(First Embodiment)

An apparatus for manufacturing a solid electrolytic capacitor of a first embodiment includes (1) an anodization part for forming a dielectric oxide film on a surface of a porous anode element made of a valve action metal, the anode element having embedded therein an anode lead line with one end portion of the anode lead line exposed to an outside; (2) a polymerization part for forming a solid electrolytic layer made of an electroconductive polymer on the dielectric oxide film by a chemical oxidation polymerization, and comprising a plurality of polymerization baths of substantially the same structure, and a conveyance mechanism, wherein the plurality of polymerization baths are placed around the conveyance mechanism within a conveyance range; (3) a cathode layer formation part for forming a cathode layer on the solid electrolytic layer and providing a capacitor element; (4) an assembly part for connecting the anode lead line with an anode terminal and connecting the cathode lead line with a cathode terminal, the anode and cathode terminals being for connecting with an outer circuit; (5) a molding part for covering the capacitor element with a covering resin with respective portions of the anode and cathode terminals exposed to an outside. In addition, the polymerization part includes a cleansing bath, and the cleansing bath and the plurality of the polymerization baths are formed of substantially the same structure.

According to the above manufacturing apparatus, the polymerization part which requires the largest area for installation in the manufacturing apparatus can be assembled compactly with the polymerization part unitized together with the constituent baths. Accordingly, it is possible to produce the manufacturing apparatus at a lower cost. In addition, since each of the plurality of the polymerization baths can be independent, all lines of the production processes do not have to be halted even if an accident happens in a subsequent production process halfway, making it possible to improve an operation rate, yield, and productivity.

Figure 12A:
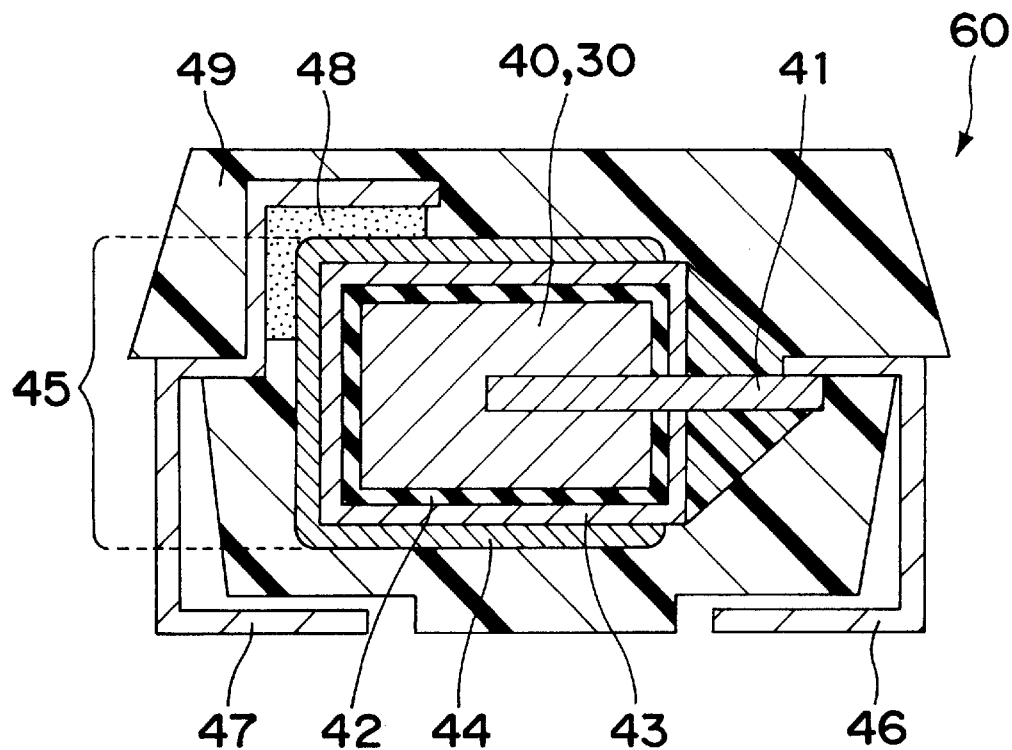
FIG. 12A is a schematic sectional view showing the standard solid electrolytic capacitor.
Figure 12B:
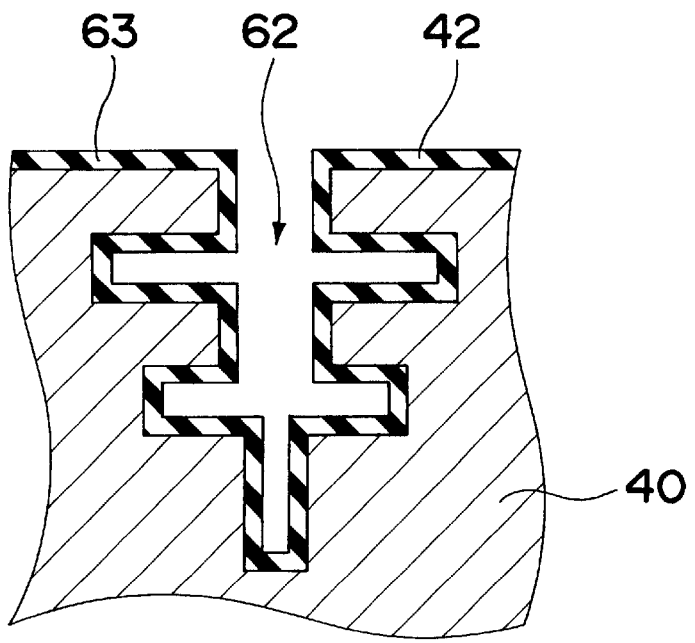
FIG. 12B is a fragmentary enlarged diagram showing an anode element.
Figure 13:
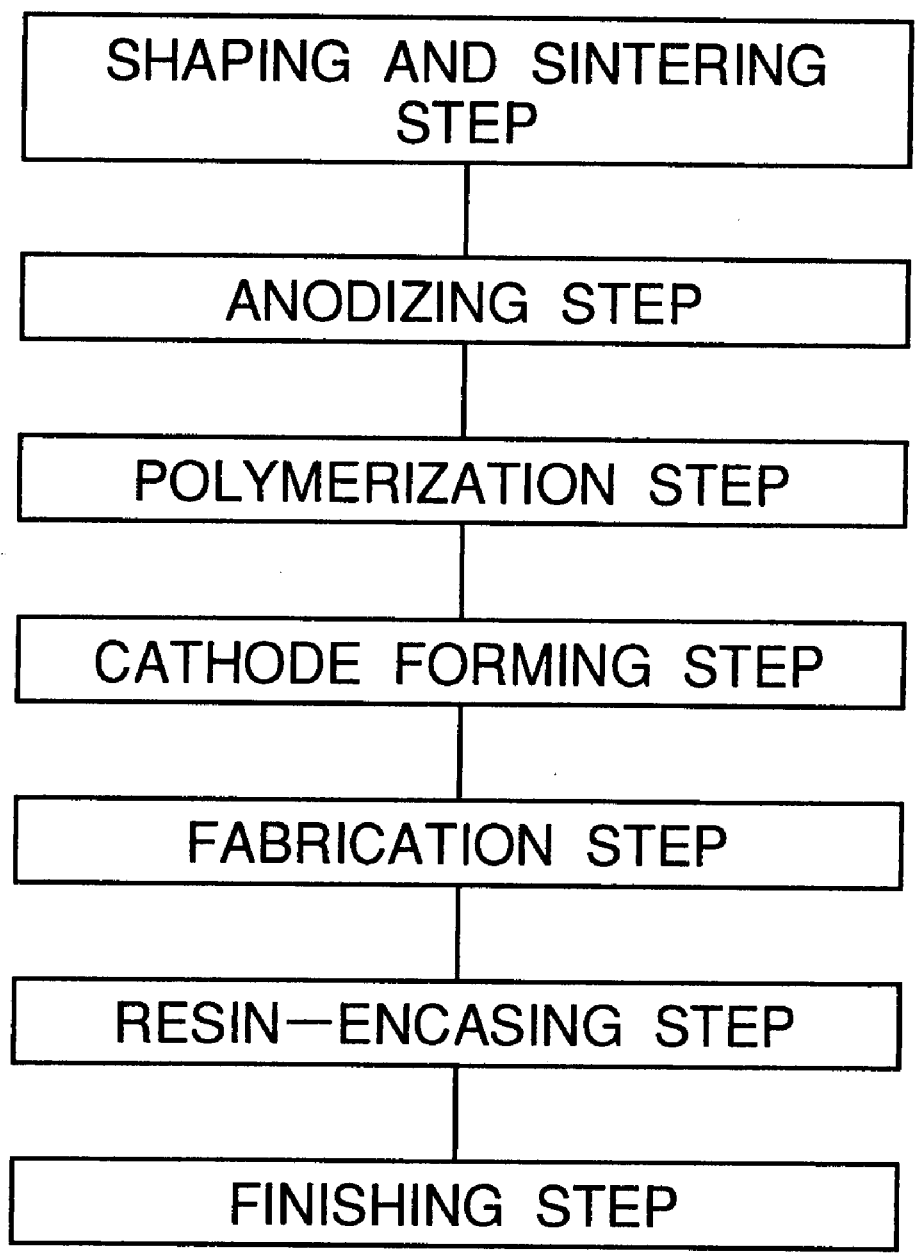
FIG. 13 is a flowchart showing the sequence of manufacture of the solid electrolytic capacitor according to the prior art.
Figure 14:
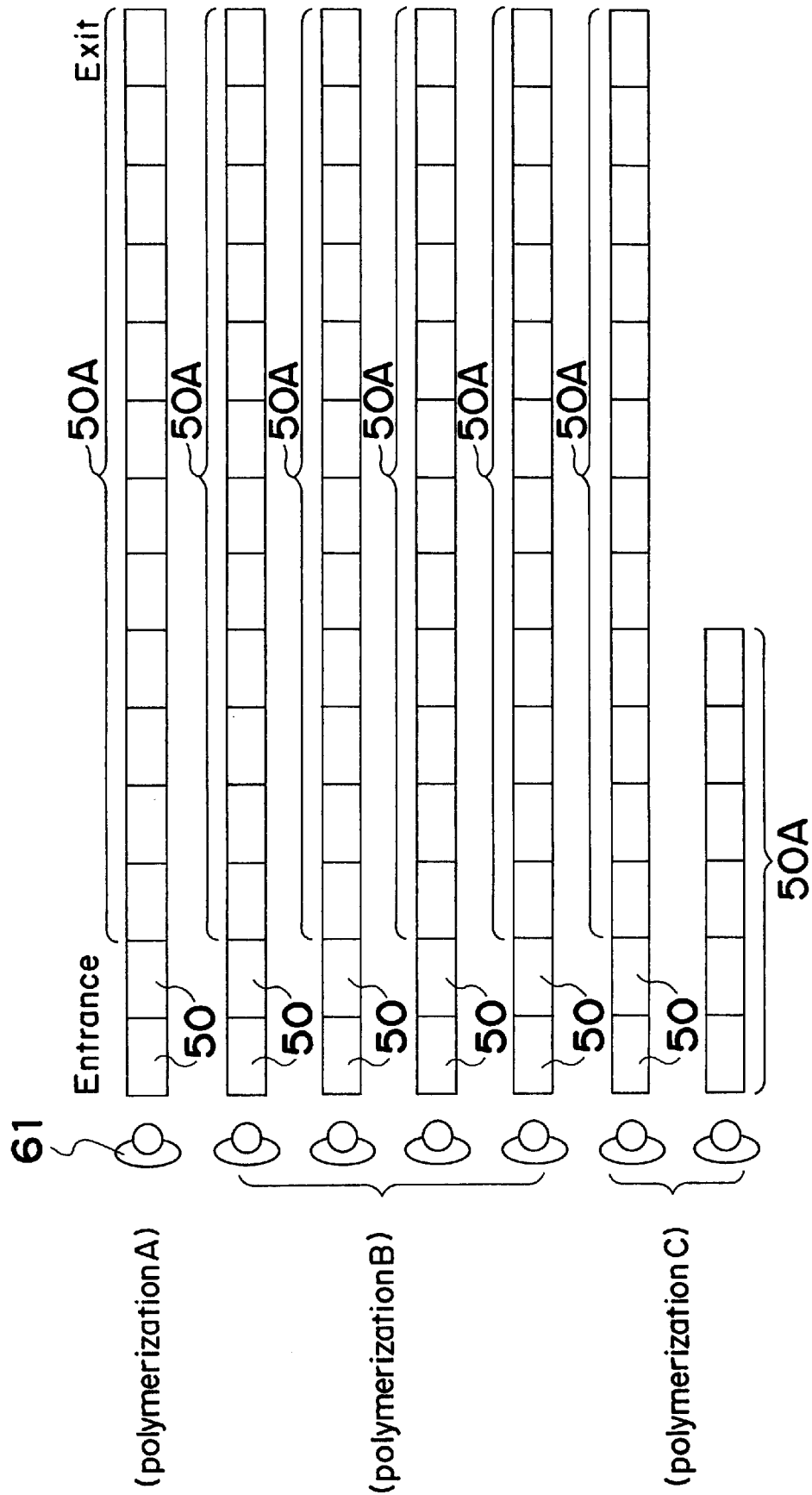
FIG. 14 is a schematic illustration showing a layout of a polymerization part included in the apparatus for manufacturing the solid electrolytic capacitor according to the prior art.
Figure 15:
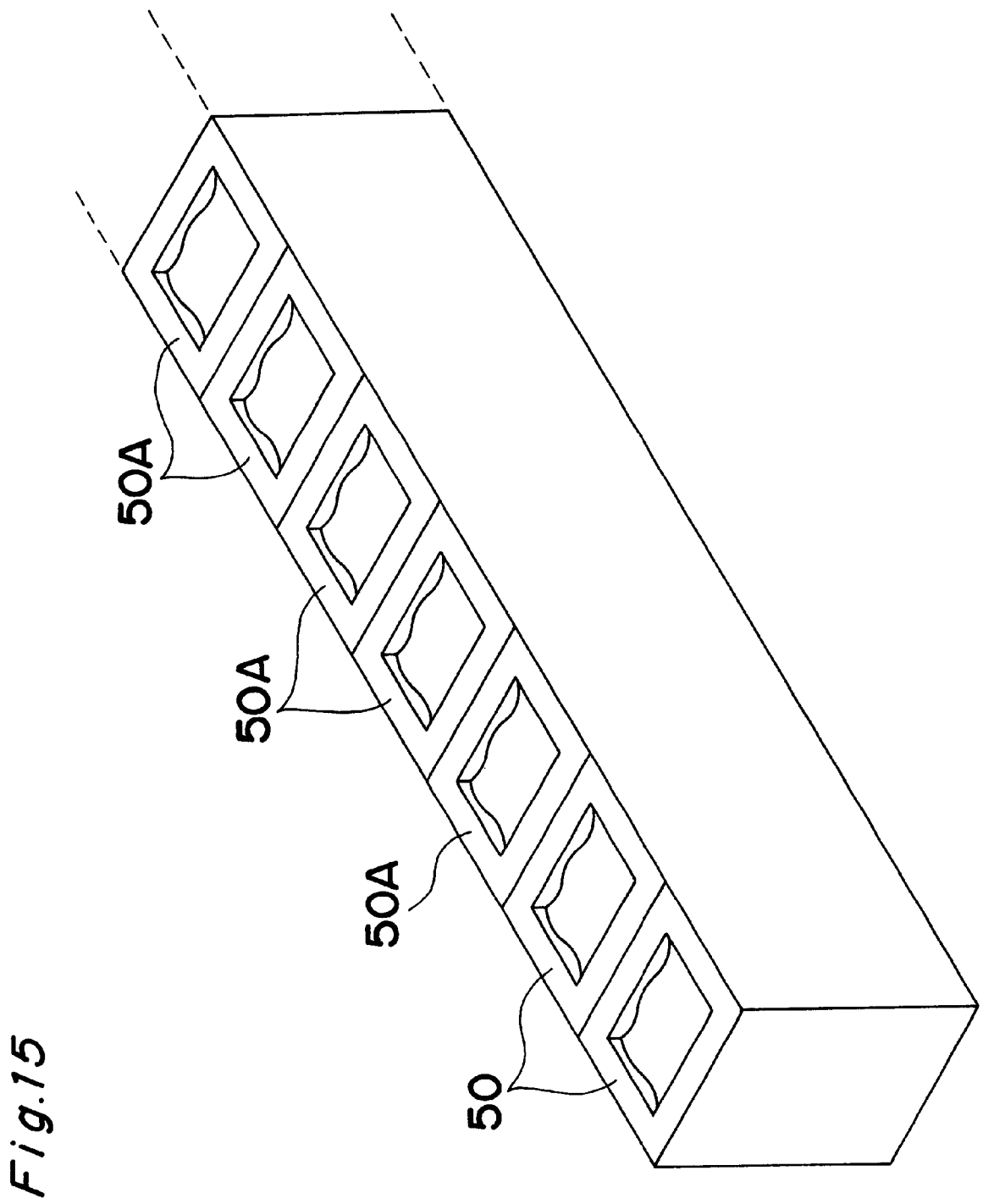
FIG. 15 is a partially enlarged view of the polymerization part of FIG. 14.
Figure 16A:
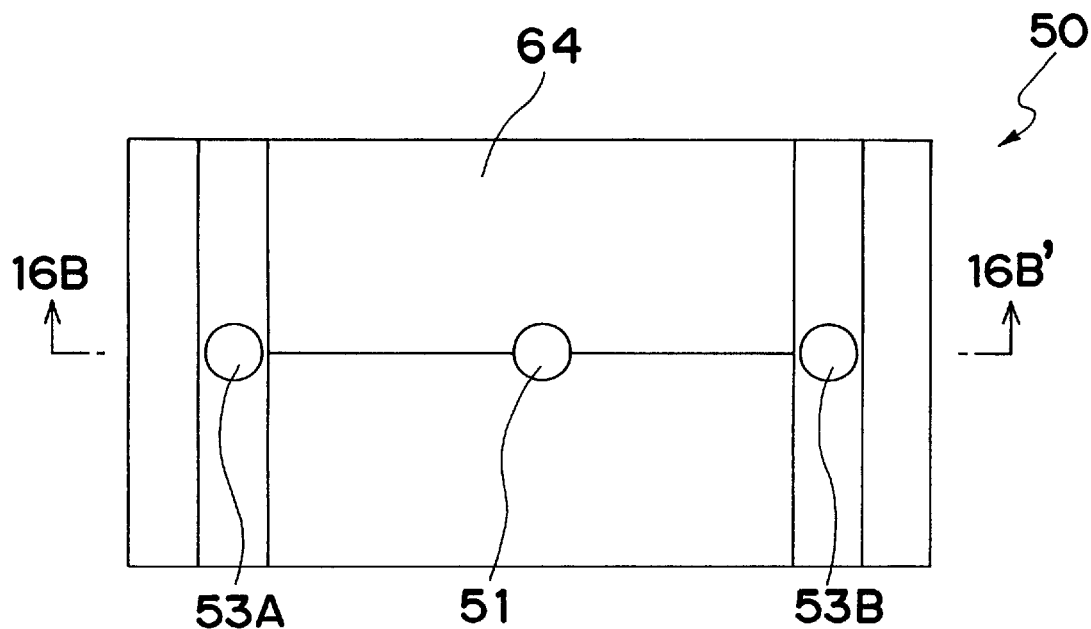
FIG. 16A is a schematic plan view of a polymerization bath in an apparatus for manufacturing the solid electrolytic capacitor according to the prior art.
Figure 16B:
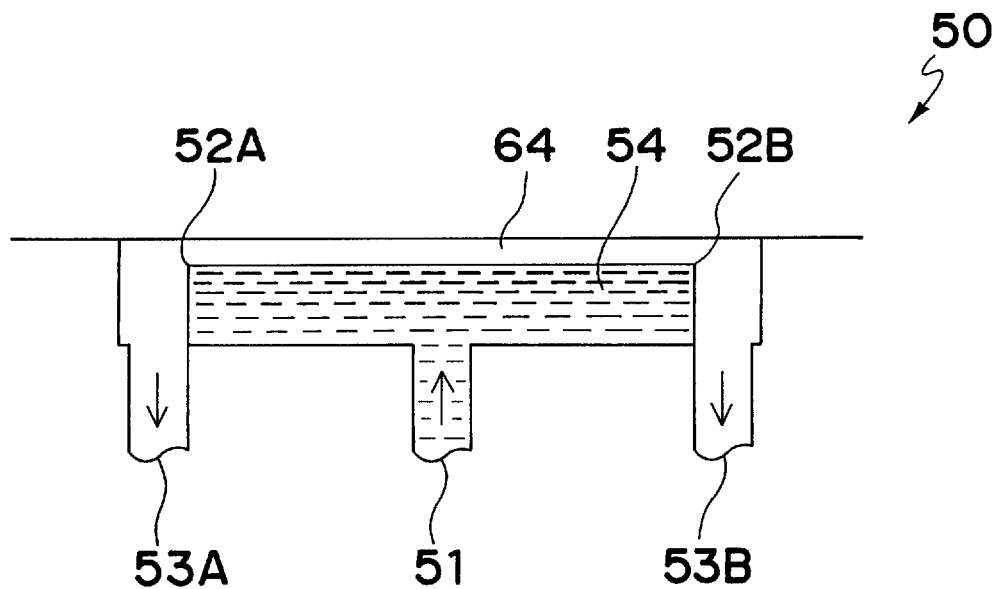
FIG. 16B is a partially sectional view along section lines 16B–16' of FIG. 16A.

The manufacturing apparatus according to the first embodiment of the present invention will be described in more detail with reference to FIGS. 1 and 2. It is to be noted that the solid electrolytic capacitor referred to in connection with the present invention is of a structure substantially identical with that of the standard solid electrolytic capacitor 60 of FIG. 12 discussed in connection with the prior art.

Figure 1:
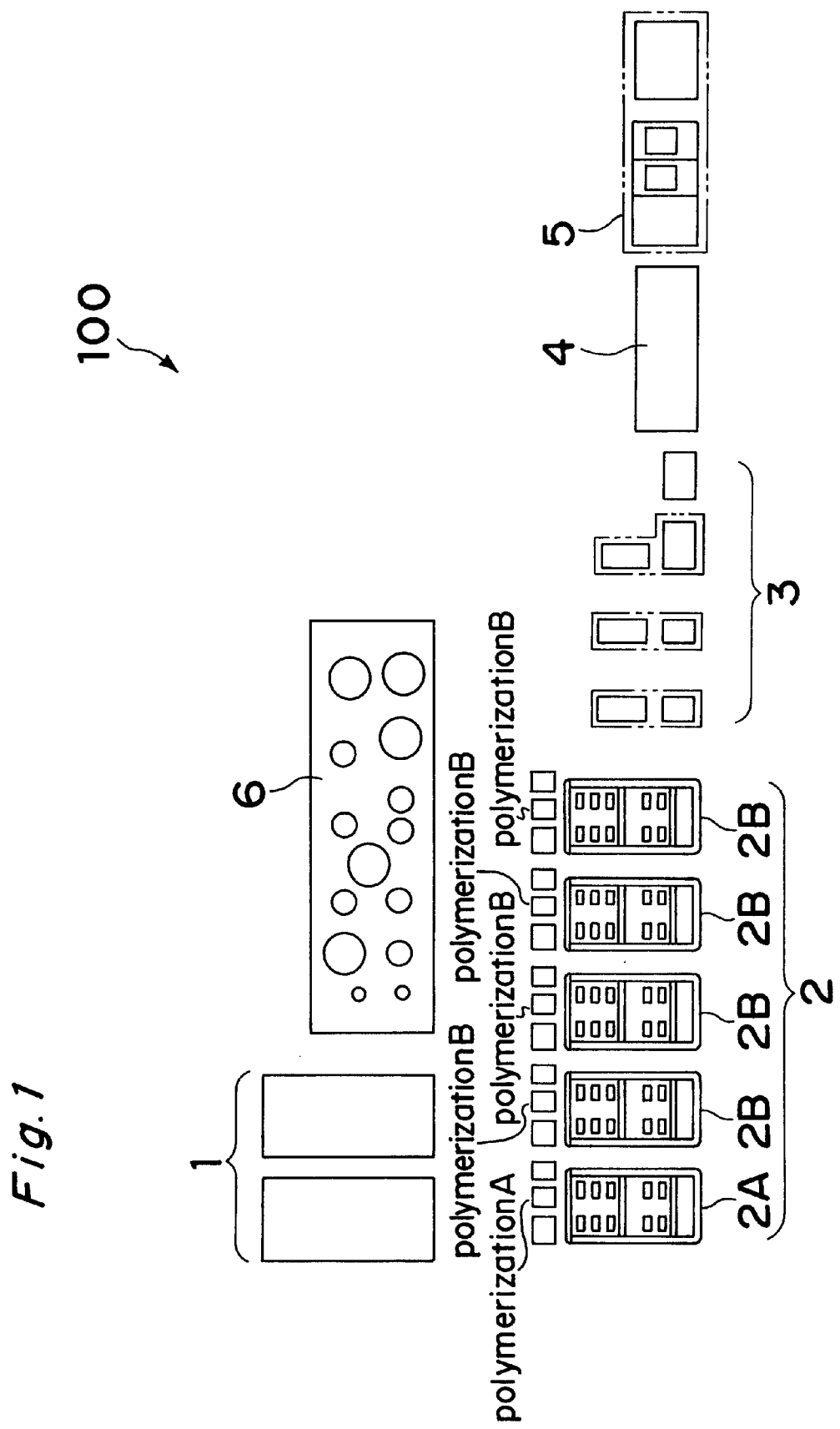
FIG. 1 is a schematic illustration showing a layout of an apparatus for manufacturing a solid electrolytic capacitor according to a first embodiment of the present invention.

In FIG. 1, there is shown a layout of the apparatus 100 for manufacturing the solid electrolytic capacitor according to the first embodiment. The manufacturing apparatus 100 includes an anodization part 1, a polymerization part 2, a cathode layer formation part 3, an assembly part 4, and a molding part 5. The polymerization part 2 includes one polymerization part 2A and four polymerization parts 2B for polymerization processes A and B, respectively. The apparatus 100 may further include a solution-preparation part for preparing and supplying or recovering an anodization solution used in the anodization part and/or a polymerization solution used in the polymerization part.

Figure 2:
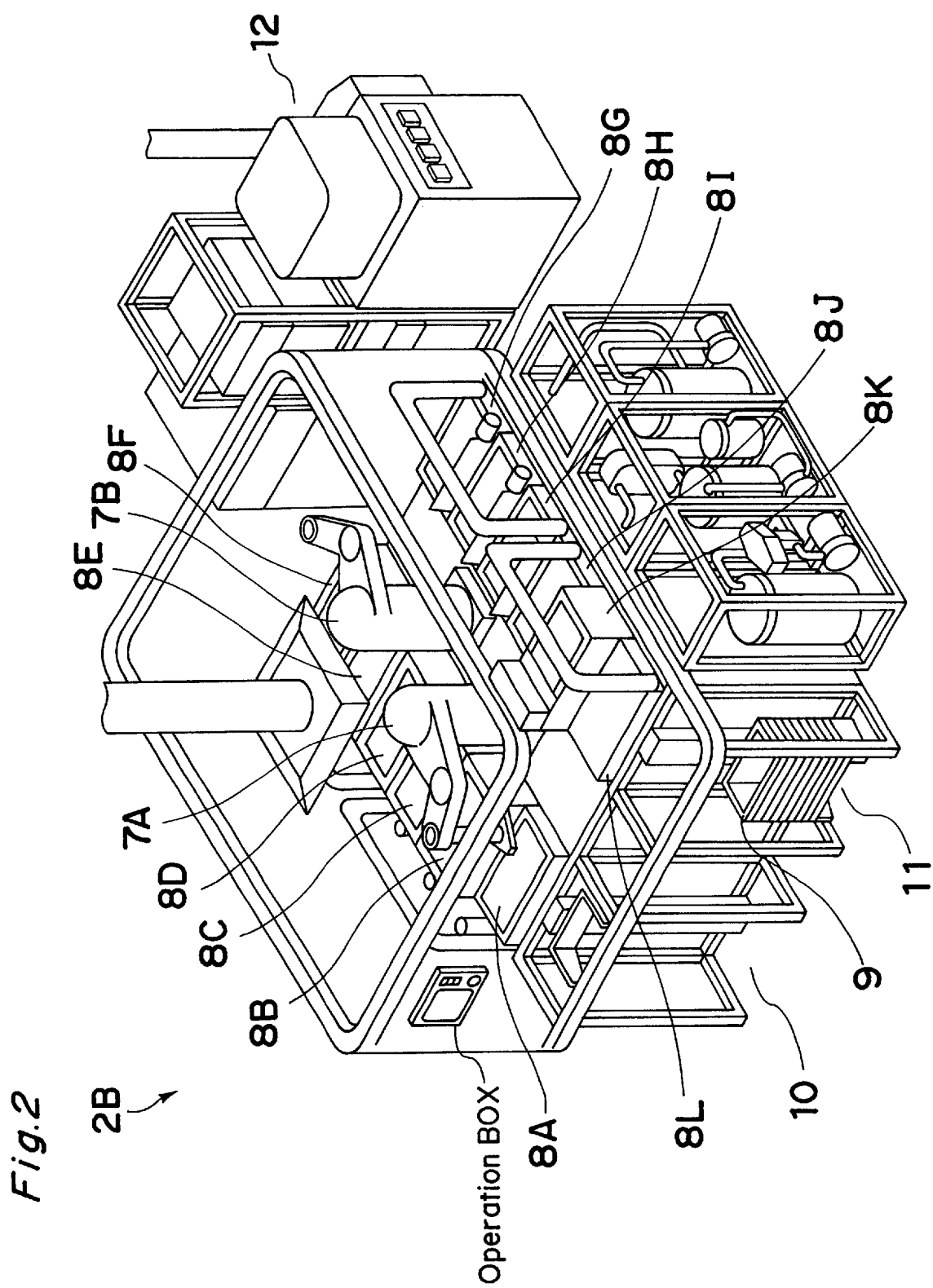
FIG. 2 is an enlarged perspective view of a polymerization part 2A included in a polymerization part 2.

FIG. 2 is an enlarged perspective view showing, for example, the polymerization part 2B for a polymerization process B in the polymerization part 2. As shown in FIG. 2, the polymerization part 2B includes a conveyance mechanism such as robots 7A and 7B, and a plurality of baths 8A through 8L around the robots 7A and 7B within an operation range of the robots 7A and 7B located at a substantially center position of the operation range. The baths 8A through 8F are arrayed in line, and the baths 8G through 8L are arrayed in line and parallel to the array of the baths 8A through 8F. The baths 8A through 8L include polymerization baths 8A and 8B, retention baths 8C through 8F, anodization baths 8G through 8I, cleansing bath 8J, a drying bath 8K, and a cooling bath 8L, all being of substantially the same structure and hence having compatibility with each other. In addition, the baths 8C and 8D are cooled by means of a cooling system 12.

A polymerizing method performed in the polymerization part 2B is described as follows. At first, an anode element 30 (not shown in FIG. 2, and see FIG. 12) carried on a pallet 9 enters the polymerization part 2B through an entrance 10. Then, the anode element 30 is immersed into a pyrrole monomer solution within the bath 8A, followed by immersing into a solution of an oxidizing agent within the bath 8B. Thereafter, the anode element 30 is cooled and retained in the baths 8C and 8D for a predetermined time, then in the baths 8E and 8F at an ordinary temperature for a predetermined time. The anode element 30 is then repaired by anodizing in the baths 8G, 8H, and 8I and, thereafter, cleansed with hot water in the bath 8J. The resultant anode element 30 is dried in the bath 8K, and finally cooled in the bath 8L. The above describes one cycle. The polymerization process B finishes by repeating this cycle 14 times.

The anode element 30 having been subjected to the polymerization process B is ejected from an exit 11 of the polymerization part 2B, and then carried on to the next step. It is to be noted that the baths 8C and 8D are used for retaining the anode element 30 at a low temperature, and the baths 8E and 8F are used for retaining the anode element 30 at an ordinary temperature, in order to coordinate the overall production, since these retaining steps at a low temperature and at an ordinary temperature require more time than other steps.

As hereinabove described, the polymerization part 2B has the robots 7A and 7B and the baths 8A through 8L placed around the robots 7A and 7B within the operation range of the robots 7A and 7B, making it possible to convey the anode element 30 between the baths 8A though 8L by means of the robots 7A and 7B. Hence, the size of the polymerization part can be reduced. In addition, each of the baths 8A through 8L are formed of substantially the same structure, and the manufacturing apparatus can be produced at a lower cost.

It is to be noted that the polymerization part (the polymerization part 2A) other than the polymerization part 2B can be substantially the same as the polymerization part 2B, although the polymerization part 2B is exemplified in the first embodiment.

(Second Embodiment)

The apparatus according to the second embodiment of the present invention includes a plurality of the polymerization parts, and a plurality of solid electrolytic layers can be formed on the anode element by means of the manufacturing apparatus, making it possible to provide the solid electrolytic capacitor of an increased high performance.

The apparatus 110 for manufacturing the solid electrolytic capacitor according to the second embodiment of the present invention will be described in more detail with reference to FIG. 3. FIG. 3 is a schematic illustration showing a layout of the manufacturing apparatus 110.

The apparatus 110 differs from that according to the first embodiment in that the polymerization part 2 in the apparatus 110 further includes two polymerization parts 2C.

According to the above-mentioned manufacturing apparatus 110, a solid electrolytic layer made of polythiophene, which is different from the solid electrolytic layer made of polypyrrole formed by means of the polymerization parts 2A and 2B, is further formed on the anode element 30 by means of the two polymerization parts 2C. The solid electrolytic capacitor produced by the manufacturing apparatus 110 includes the solid electrolytic layer made of polythiophene over the surface of the solid electrolytic layer made of polypyrrole, the solid electrolytic capacitor has a higher capacity and an excellent adhesion to the cathode layer 44, making it possible to provide the solid electrolytic capacitor of a higher performance.

Although the polymerization part 2 further includes the polymerization parts 2C as in the second embodiment, the size of the polymerization part 2 does not considerably increase and, therefore, the manufacturing apparatus 110 has a small size and is produced at a low cost in a manner similar to that of the first embodiment.

(Third Embodiment)

The apparatus according to the third embodiment of the present invention further includes an inspection part for inspecting the capacitor element which has been subjected to the molding part, and a packaging part for packaging the inspected capacitor element, so that a continuous production of the solid electrolytic capacitor can be possible.

The apparatus 120 will be described in more detail with reference to FIG. 4. FIG. 4 is a schematic illustration showing a layout of the manufacturing apparatus 120 according to the third embodiment of the present invention.

The apparatus 120 shown therein differs from that according to the second embodiment in that the apparatus 120 further includes an inspection part 13 for inspecting the capacitor element and a packaging part 14 for packaging the inspected capacitor element.

According to the above-mentioned manufacturing apparatus 120, the capacitor element which has been molded by the molding part 5 is inspected by the inspection part 13 and is, thereafter, packaged by the packaging part 14. Since the manufacturing apparatus 120 further includes the inspection part 13 and the packaging part 14, the solid electrolytic capacitor can be produced by a continuous operation by means of the apparatus 120, and therefore, productivity can be increased.

(Fourth Embodiment)

The polymerization bath used in the manufacturing apparatus according to a fourth embodiment of the present invention will be described in more detail with reference to FIGS. 5A and 5B. In the apparatus according to the fourth embodiment, the polymerization bath includes (1) a first open-topped cavity to be filled with a polymerization solution; (2) a supply passage for supplying the first cavity with the polymerization solution, the supply passage being placed at one end of a bottom surface of the first cavity and communicated with the first cavity; (3) an interruptible jet plate for preventing a jet of the polymerization solution supplied through the supply passage, and the interruptible jet plate being placed adjacent to a connection part of the supply passage and the first cavity; (4) a guide plate for restraining a rise of a level of the polymerization solution which is supplied to the first cavity via the interruptible jet plate, and the guide plate being located from one end of the first cavity adjacent to the interruptible jet plate to a substantially center position of the first cavity; and (5) a level controlling mechanism for controlling the level of the polymerization solution supplied into the first cavity at a predetermined amount. In addition, the guide plate has a trapezoid shape, and the guide plate has a first edge and a second edge which is parallel with and shorter than the first edge, and the first edge is located at the one end of the first cavity adjacent to the interruptible jet plate and the second edge is located at the substantially center position of the first cavity. The guide plate is located so that a height of the second edge is lower than that of the first edge. The level controlling mechanism includes a weir board placed at a predetermined height of the first cavity.

According to the above manufacturing apparatus, the polymerization bath has the interruptible jet plate and the guide plate, making it possible to prevent an occurrence of the bubbles in the polymerization solution during when the cavity of the bath is supplied with the polymerization solution. Accordingly, the cavity can be filled with the polymerization solution for a shorter period. In addition, a level of the polymerization solution is precisely controlled by the interruptible jet plate, and hence, an operation efficiency can be improved and the solid electrolytic layer can be uniformly formed.

It is to be noted that the polymerization bath used in the fourth, fifth, sixth, seventh, and eighth embodiments can be preferably used as, for example, at least one of the baths 8A, 8B, 8G, 8H, 8I, and 8J in FIG.2.

Figure 5A:
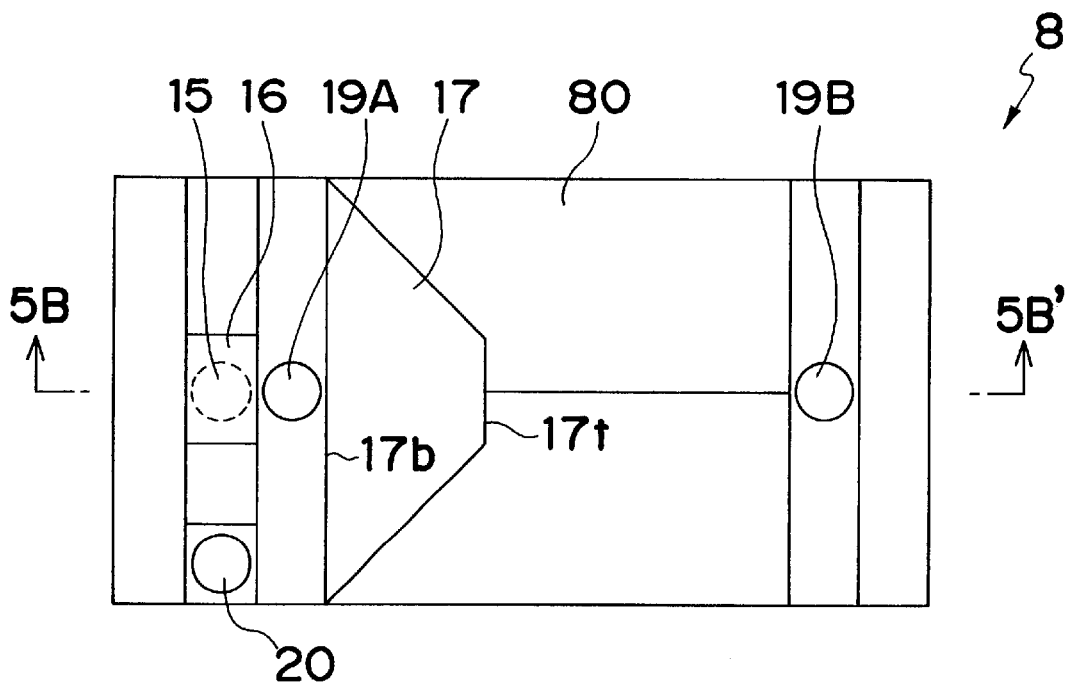
FIG. 5A is a schematic plan view of a polymerization bath used in a fourth embodiment of the present invention.
Figure 5B:
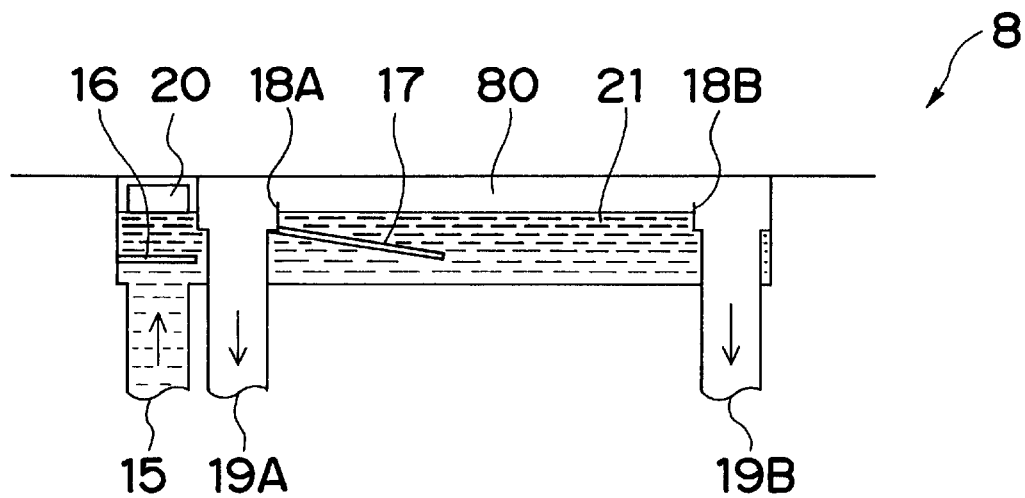
FIG. 5B is a partially cross-sectional view along section lines 5B–5B' of FIG. 5A.

Referring now to FIGS. 5A and 5B, there are shown a plan view and a sectional view of the polymerization bath 8, respectively. The polymerization bath 8 has an open-topped cavity (first cavity) 80, a supply passage 15 for supplying the cavity 80 with a polymerization solution 21 from a tank (not shown) of the polymerization solution 21, the supply passage 15 being placed at one end of the bottom surface of the cavity 80 in communication with the cavity 80, an interruptible jet plate 16, a guide plate 17, weir boards 18A and 18B placed in the cavity 80, waste liquid tubes 19A and 19B for draining a portion of polymerization solution 21 that overflows the weir boards 18A and 18B, and a floating board 20. The interruptible jet plate 16 is placed adjacent an end part of the supply passage 15, that is, adjacent a connection part of the supply passage 15 and the cavity 80. The guide plate 17 is located from one end of the cavity 80 adjacent the interruptible jet plate 16 to a substantially center position of the cavity 80, and restrains a rise of a level of the polymerization solution 21 which is supplied into the cavity 80 via the interruptible jet plate 16, in order to supply uniformly the cavity 80 with the polymerization solution 21. The floating board 20 is for detecting the level of the polymerization solution 21.

Hereinafter, an operation of the polymerization bath 8 according to the fourth embodiment will be described. At first, the polymerization solution 21 is supplied from the solution tank into the cavity 80 through the supply passage 15 placed at one end of the bottom surface and the polymerization solution 21 meets the interruptible jet plate 16. Therefore, the direction of flow of the polymerization solution 21 changes 90 degree and becomes horizontal (parallel to the bottom surface of the cavity 80), and the cavity 80 is supplied with the polymerization solution 21 while the polymerization solution 21 is prevented from bubbling. The level of the polymerization solution 21 tends to rise when the polymerization solution 21 is supplied to the cavity 80. However, the guide plate 17 prevents a partial rise of the level of the polymerization solution 21 due to inflow of the polymerization solution 21 from the supply passage 15, while it prevents an occurrence of bubbles according to the fourth embodiment of the present invention.

In addition, the guide plate 17 has a trapezoid shape having a first edge 7b and a second edge 17t which is parallel to, but shorter than the first edge 17b. The first edge 17b is located at one end of the cavity 80 adjacent the interruptible jet plate 16 and the second edge 17t is located at a substantially center position of the cavity 80 as shown in FIGS. 5A and 5B. Moreover, the guide plate 17 is angularly movably supported with the second edge 17t held at a level lower than that of the first edge 17b as shown in FIG. 5B. Since the manufacturing apparatus has the above-described polymerization bath 8, the cavity 80 can be supplied uniformly with the polymerization solution 21 while a rise of the level of the polymerization solution 21 and an occurrence of bubbles are prevented.

In addition, the level of the polymerization solution 21 can be detected by means of the floating board 20, and an excessively supplied polymerization solution 21 overflows the weir boards 18A and 18B and then is drained to an outside of the cavity 80 through the waste liquid tubes 19A and 19B. Therefore, an amount of the polymerization solution 21 in the cavity 80 can be highly precisely controlled at a desired amount.

As hereinabove described, according to the fourth embodiment of the present invention, the polymerization bath has the interruptible jet plate 16 and the guide plate 17, making it possible to prevent an occurrence of the bubbles in the polymerization solution 21 during when the cavity 80 of the bath 8 is supplied with the polymerization solution 21. Accordingly, the cavity 80 can be filled with the polymerization solution 21, while the polymerization solution 21 is prevented from bubbling and the level of the polymerization solution 21 is continuously controlled precisely, and hence, the operation efficiency can be improved and the solid electrolytic layer can be uniformly formed.

It is to be noted that although the guide plate 17 has a trapezoid shape, and the first edge 17b is located at one end of the cavity 80 adjacent the interruptible jet plate 16 and the second edge 17t, which is shorter than and parallel to the first edge 17b, is located at a substantially center of the cavity 80, and the height of the edge 17t is held at a level lower than that of the edge 17b in the fourth embodiment, the shape and the location of the guide plate 17 may not be limited thereto. By way of example, the guide plate may be bent so that the second edge 17t can be oriented downwards to face the bottom surface of the cavity 80, with a similar effect being provided.

(Fifth Embodiment)

Figure 6A:
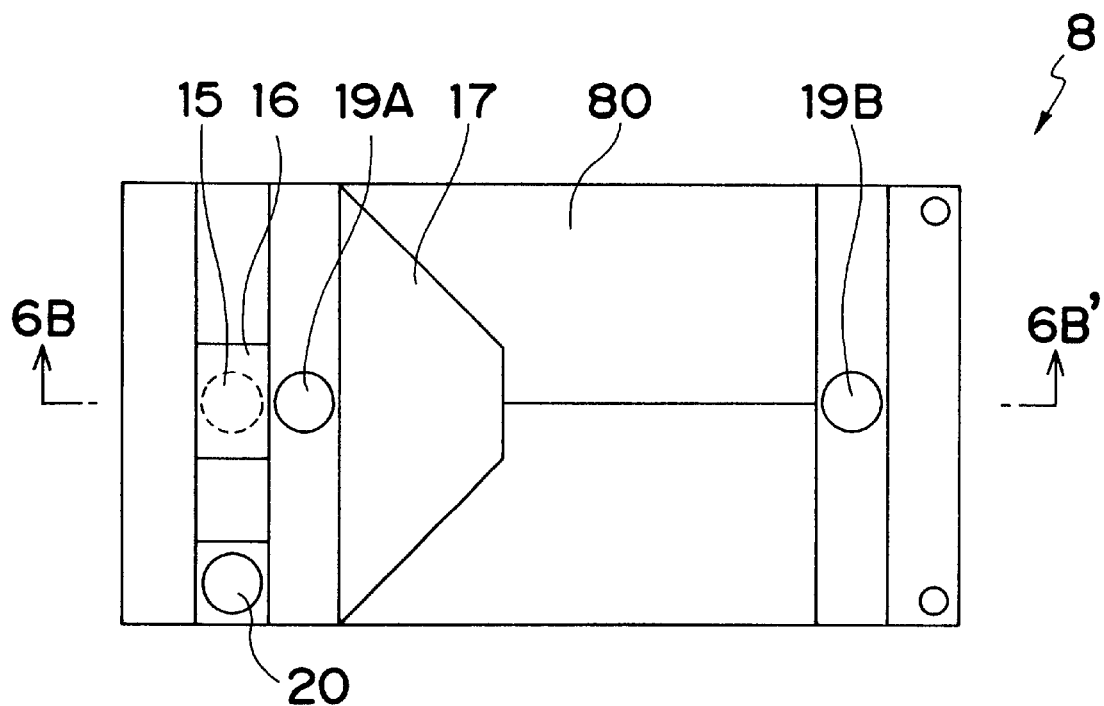
FIG. 6A is a schematic plan view of a polymerization bath used in a fifth embodiment of the present invention.
Figure 6B:
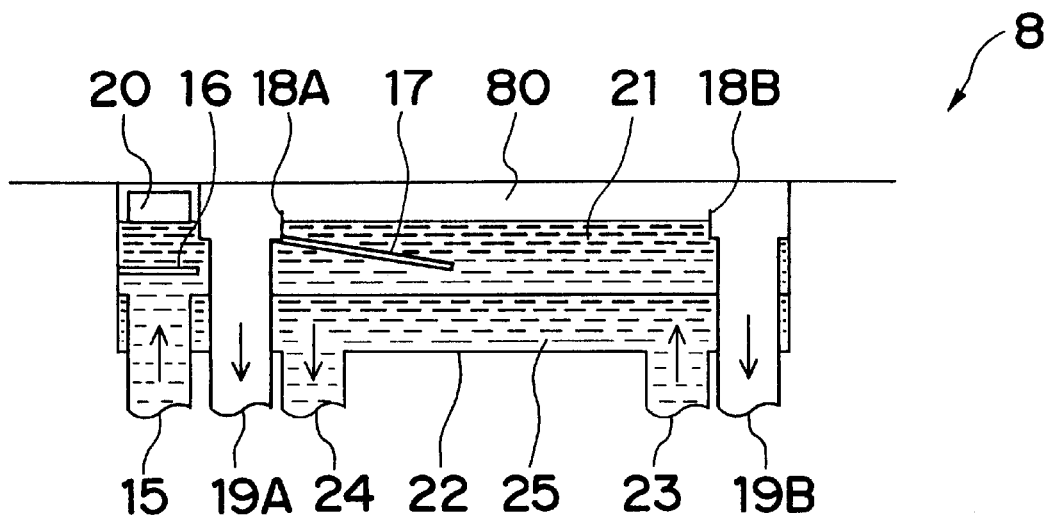
FIG. 6B is a partially cross-sectional view along section lines 6B–6B' of FIG. 6A.

The polymerization bath used in this apparatus according to a fifth embodiment of the present invention will be described in more detail with reference to FIGS. 6A and 6B. FIG. 6A is a schematic plan view of the polymerization bath used in the fifth embodiment of the present invention and FIG. 6B is a schematic sectional view of the polymerization bath of FIG. 6A. The polymerization bath used in this apparatus differs from that according to the fourth embodiment in that the polymerization bath further includes a second cavity below the first cavity and has a double-layered structure.

As shown in FIGS. 6A and 6B, the polymerization bath 8 has a second cavity 22 defined below the first cavity 80, and the second cavity being connected to an inlet 23 and an exit 24. The second cavity 22 is filled with, and has circulated therethrough, an antifreezing fluid 25, and the antifreezing fluid 25 is supplied from the inlet 23 and ejected from the exit 24. The antifreezing fluid 25 is cooled to have a desired temperature within a supply tank (not shown).

As hereinabove described, according to the fifth embodiment of the present invention, the polymerization bath has the second cavity 22, and the cooled antifreezing fluid 25 circulates in the second bath 22 via the inlet 23 and the exit 24, making it possible to control the polymerization solution 21 to a desired temperature and, hence, the polymerization process can be performed more precisely. Accordingly, the solid electrolytic layer can be uniformly formed and the solid electrolytic capacitor having a high reliability can be manufactured.

(Sixth Embodiment)

Figure 7A:
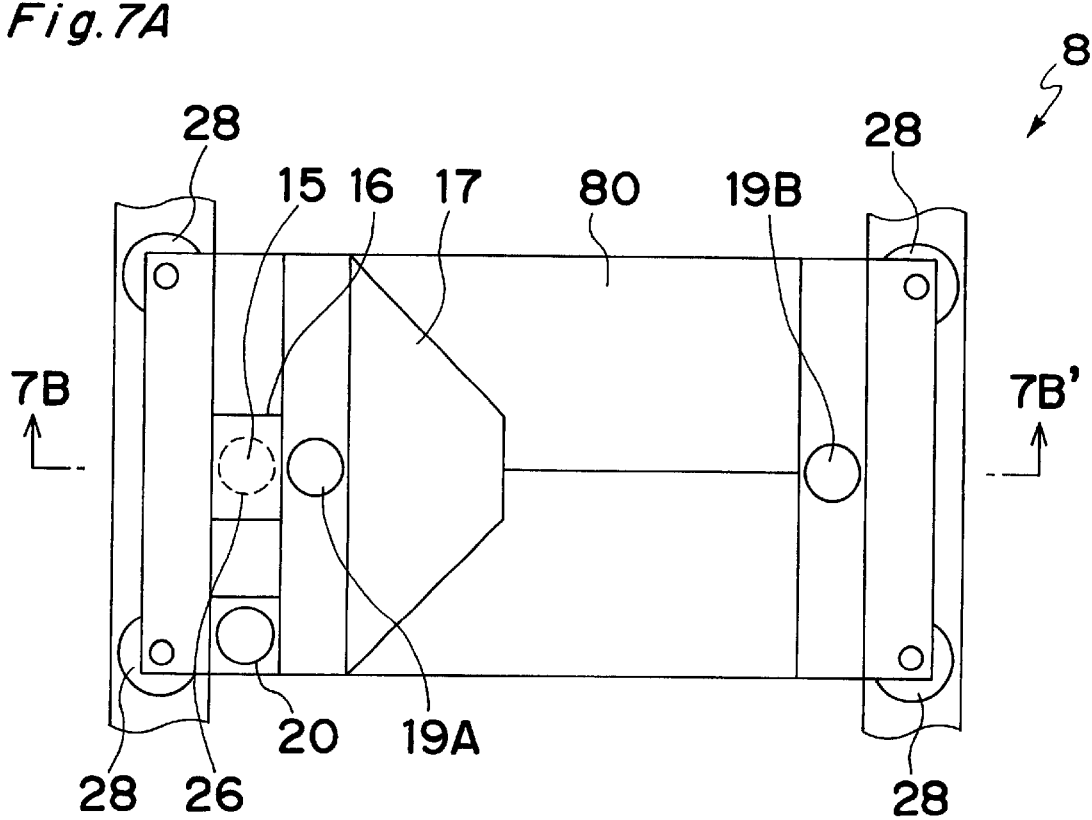
FIG. 7A is a schematic plan view of a polymerization bath used in a sixth embodiment of the present invention.
Figure 7B:
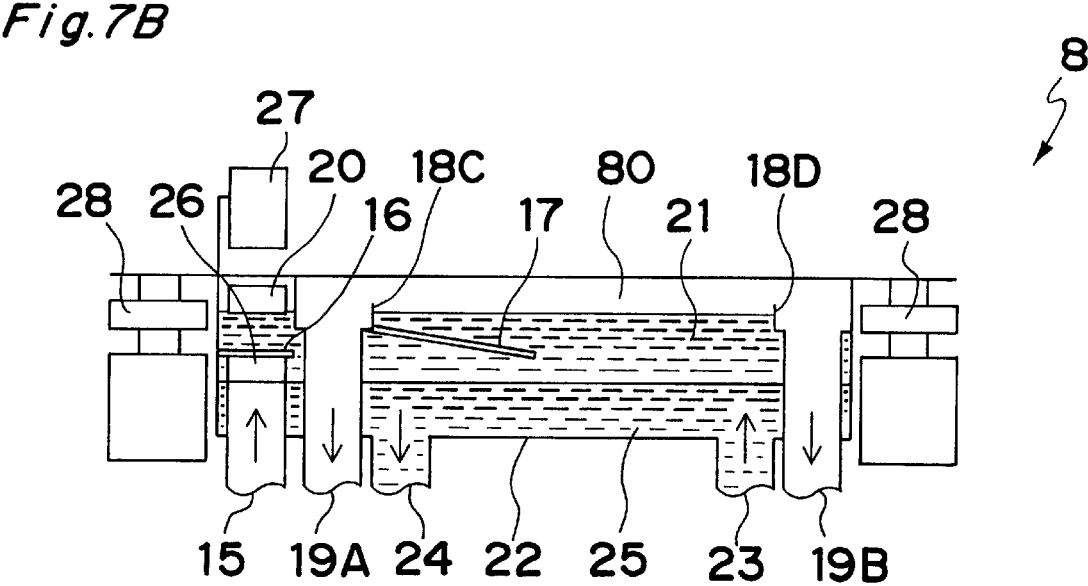
FIG. 7B is a partially cross-sectional view along section lines 7B–7B' of FIG. 7A.
Figure 8:
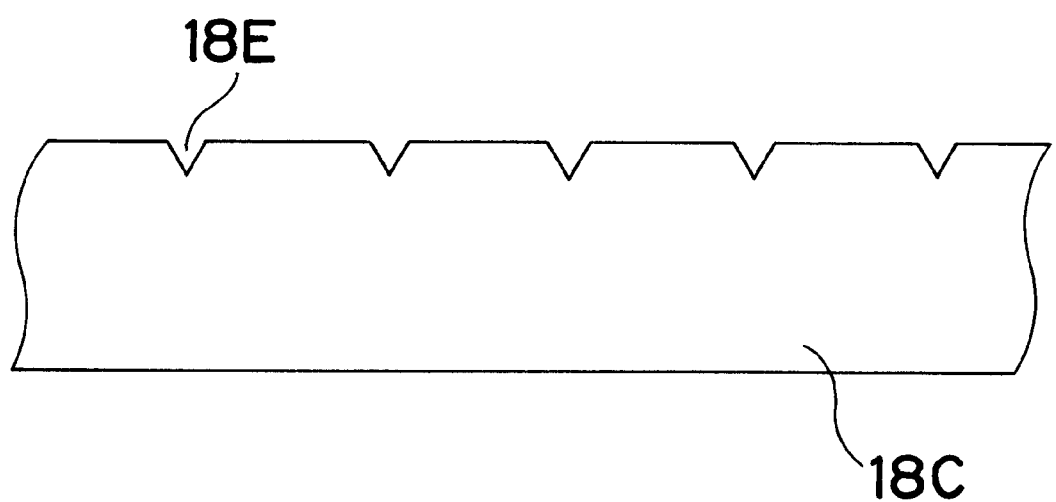
FIG. 8 is a partially side view of a weir board used in the polymerization bath of FIGS. 7A and 7B.

In the apparatus according to a sixth embodiment shown in FIGS. 7A, 7B and 8, the at least one of the polymerization baths has (1) a net for reducing a bubble size placed adjacent to a connection part of the supply passage and the first cavity; (2) the weir board being located substantially perpendicular to a depth direction of the first cavity, the weir board having an edge which the polymerization solution overflows, and the weir board having two or more notches on the edge thereof; (3) a sensor as a level controlling mechanism placed at a predetermined height; and (4) an adjustment screw of a horizontal level of the first cavity, located on an external wall of the first cavity.

The at least one of the polymerization baths has the net for reducing a bubble size, making it possible to fill the first cavity with the polymerization solution while the polymerization solution is prevented from bubbling in the case where the polymerization solution is supplied to the first cavity at a high speed. The weir board has two or more notches on the edge thereof, making it possible to provide an excellent circulation of the polymerization solution. In addition, the level of the polymerization solution can be precisely controlled due to the sensor, and a horizontal level of the polymerization solution can be easily adjusted due to the adjustment screw of a horizontal level of the first cavity.

The polymerization bath used in the manufacturing apparatus according to the sixth embodiment of the present invention will be described with reference to FIGS. 7A, 7B, and 8. FIGS. 7A is a schematic plan view of the polymerization bath used in the sixth embodiment of the present invention, FIG. 7B is a schematic sectional view of the polymerization bath of FIG. 7A, and FIG. 8 is a partially side view of a weir board used in the polymerization bath of FIGS. 7A and 7B. The polymerization bath used in the manufacturing apparatus according to the sixth embodiment of the present invention differs from that according to the fifth embodiment in that the weir board in the polymerization bath has a plurality of notches, a net for reducing a size of bubbles, a sensor for controlling a level of the polymerization solution, and a screw for adjusting a horizontal level.

As shown in FIGS. 7A, 7B and 8, the polymerization bath 8 has the weir boards 18C and 18D in the first cavity 80, and the weir boards 18C and 18D have a plurality of notches 18E. Since the weir boards 18C and 18D have a plurality of 30 notches 18E, the polymerization solution 21 uniformly overflows the weir boards, when the excess polymerization solution 21 is supplied into the first cavity 80, making it possible to provide an excellent circulation of the polymerization solution 21 within the first cavity 80 and hence, it makes a great contribution to the uniform formation of the solid electrolytic layer in the solid electrolytic capacitor.

In addition, the bath 8 has the net 26 for reducing the bubble size which is located at an end of the supply passage 15, that is, located adjacent a connection part of the supply passage 15 and the cavity 80. The net 26 can prevent an occurrence of the bubbles in the polymerization solution 21, while the polymerization solution 21 is supplied to the cavity 80. Therefore, it is possible to fill the cavity 80 with the polymerization solution 21 in a shorter time, and hence, an operation efficiency can be further improved.

Moreover, the bath 8 has the sensor 27 located above the floating board 20 which floats on the surface of the polymerization solution 21. The sensor 27 detects a height of the floating board 20 and gets feedback, so that the level of the solution 21 can be controlled precisely. The bath 8 also has the screws 28 for adjusting a horizontal level, which are located at four corners of the cavity 80. By turning the four screws 28, the horizontal level of the surface of the polymerization solution 21 can be easily adjusted.

(Seventh Embodiment)

In the apparatus according to a seventh embodiment, at least one of the polymerization baths has an immersion mechanism for immersing the anode element into the polymerization solution in accordance with the rate of capillary upward flow of the polymerization solution soaked into the anode element due to a capillary phenomenon. Alternatively, the anodization part may include an anodization bath having a cavity filled with an anodization solution and an immersion mechanism for immersing the anode element into the anodization solution in accordance with the rate of capillary upward flow of the anodization solution soaked into the anode element due to a capillary phenomenon. According to the above-described manufacturing apparatus, the precise polymerization or anodization process can be performed, and the solid electrolytic capacitor having a high reliability can be manufactured.

Figure 9:
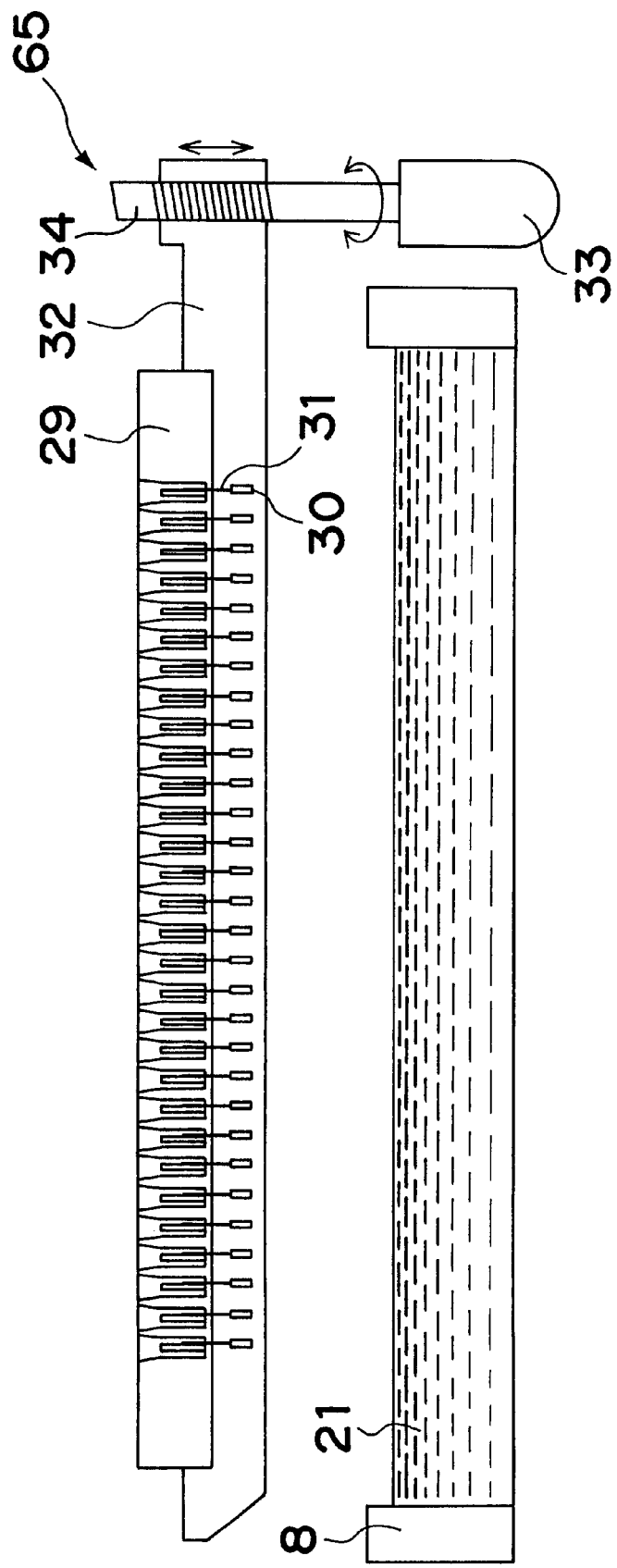
FIG. 9 is a partially sectional view showing an immersing step in which a product is immersed into a polymerization solution in a bath in a seventh embodiment of the present invention.

The apparatus according to the seventh embodiment will be described in more detail with reference to FIG. 9. FIG. 9 is a partially sectional view showing an immersing mechanism and the polymerization bath. As shown in FIG. 9, the immersing mechanism 65 includes an aluminum bar 29 to which anode lead lines 31 embedded in the respective anode elements 30 are welded, an immersion arm 32 on which the aluminum bar 29 is mounted, an AC servomotor 33, and a ball screw 34 connected with the AC servomotor 33.

Hereinafter, an immersing method used in the seventh embodiment will be described. At first, the anode lead lines 31 connected with the respective anode elements 30 are welded to the aluminum bar 29 in spaced relation to each other, and the aluminum bar 29 is mounted on the immersion arm 32. Then, the AC servomotor 33 is driven to drive the ball screw 34. The revolution of the ball screw 34 makes the immersion arm 32 move down, and hence, the anode elements 30 can be immersed into the polymerization solution 21 filled in the cavity 80.

The revolution number of the ball screw 34 is controlled so as to correspond with the rate of capillary upward flow of the polymerization solution 21 being soaked into the anode elements 30 due to a capillary phenomenon, making it possible to prevent the anode elements 30 from having attached thereto excessive polymerization solution 21. Accordingly, the polymerization process can be performed more precisely and the solid electrolytic capacitor having a high reliability can be manufactured. The anodizing process can be performed in a manner similar to that performed in the above-described polymerization process.

It is to be noted that the control of the AC servomotor 33 is carried out in accordance with the empirically acquired rising speed of the polymerization solution 21 attached to the anode element 30, and hence, the revolution number can be easily controlled precisely.

(Eighth Embodiment)

In the apparatus according to a eighth embodiment, at least one of the plurality of polymerization baths in the polymerization part has a thermocouple which is inserted from a bottom surface of the cavity toward a surface of the polymerization solution at a substantially center position of the cavity, so that the temperature of the polymerization solution can be controlled. Alternatively, the anodization part may include an anodization bath having a cavity filled with an anodization solution and a thermocouple which is inserted from a bottom surface of the cavity toward a surface of the anodization solution at a substantially center position of the cavity, so that the temperature of the anodization solution can be controlled. According to the above-described manufacturing apparatus, the precise temperature control of the polymerization or anodization solution can be performed, the solid electrolytic capacitor having a high reliability can be manufactured.

Figure 10:
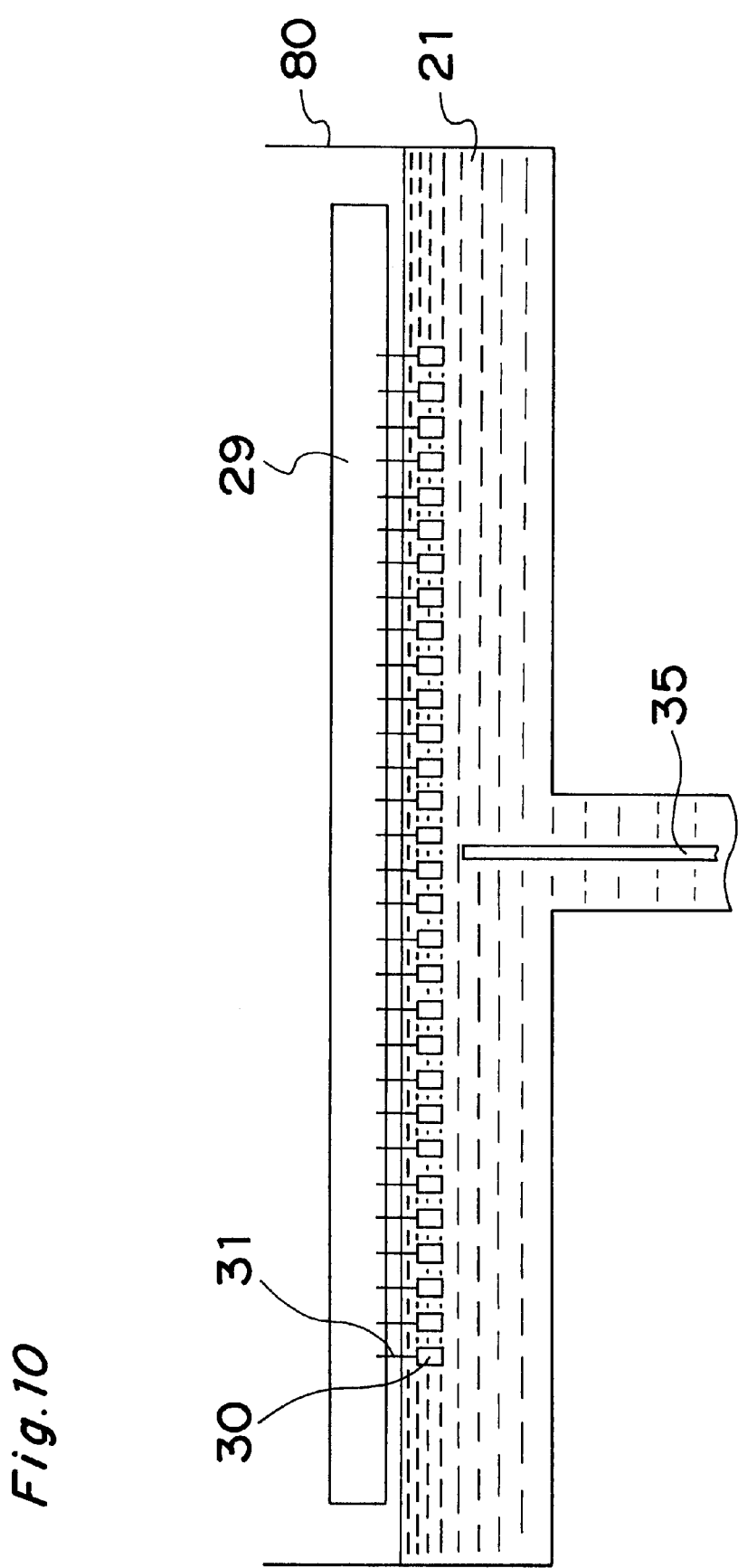
FIG. 10 is a partially sectional view of a polymerization bath used in an eighth embodiment of the present invention.

The manufacturing apparatus according to the eighth embodiment of the present invention will be described in more detail with reference to FIG. 10. FIG. 10 is a partially sectional view showing the cavity 80 of the polymerization bath. As shown in FIG. 10, the cavity 80 of the polymerization bath has a thermocouple 35, and the thermocouple 35 is inserted from the bottom surface of the cavity 80 toward the surface of the solution 21 at a substantially center position of the cavity 80. The anode lead lines 31 connected with the respective anode elements 30 are welded to the aluminum bar 29 in spaced relation to each other, and the anode elements 30 are immersed in the polymerization solution 21 in the cavity 80.

As hereinabove described, according to the eighth embodiment of the present invention, the thermocouple 35 is inserted at a substantially center position of the cavity 80 and, therefore, it is possible to measure a temperature of the polymerization solution 21 and, hence, to control it precisely. In the case where an anodization solution is used instead of the polymerization solution 21 in the eighth embodiment, the precise temperature control of the anodization solution can be performed and hence, the solid electrolytic capacitor having a high reliability can be manufactured.

(Ninth Embodiment)

In the apparatus according to a ninth embodiment, the anodization part includes an anodization bath having: a cavity filled with an anodization solution into which the anode element is immersed; a power supply having a positive electrode; and two or more voltage applying plates for electrically connecting the positive electrode of the power supply and the anode element. According to the above-described manufacturing apparatus, electric current is precisely sent to the anode element, and the solid electrolytic capacitor having a high reliability can be manufactured.

Figure 11:
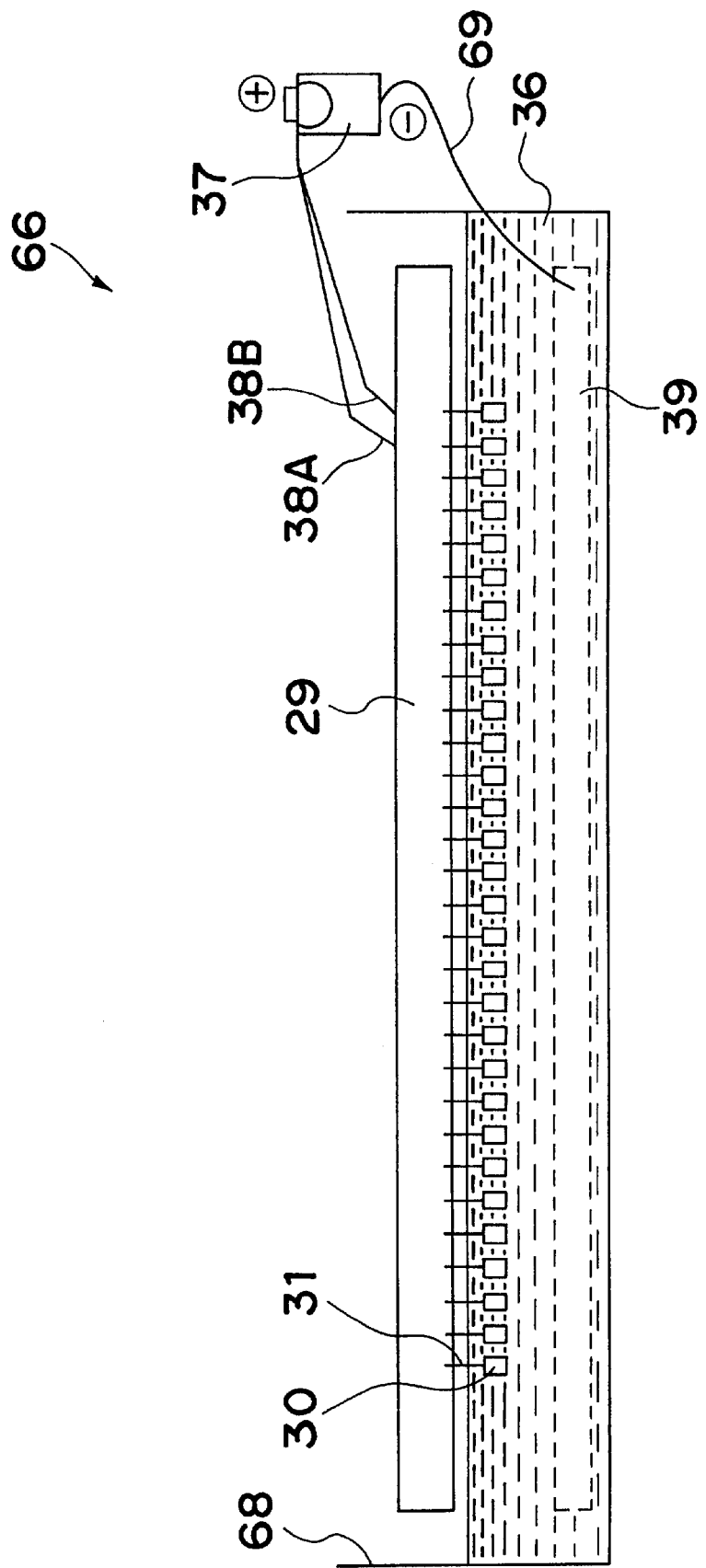
FIG. 11 is a partially sectional view of an anodization bath used in a ninth embodiment of the present invention.

The manufacturing apparatus according to the ninth embodiment of the present invention will be described in more detail with reference to FIG. 11. FIG. 11 is a partially sectional view showing an anodization bath for forming the dielectric oxide film on the anode element 30 used in the manufacturing apparatus.

As shown in FIG. 11, the anodization bath 66 has a cavity 68 filled with an anodization solution 36, a power supply 37, an aluminum bar 29, voltage applying plates 38A and 38B, an electrode plate 39 formed of carbon and immersed in the anodization solution 36 in the cavity 68, and a voltage applying plate 69 connecting between the negative electrode of the power supply 37 and the electrode plate 39. Each of the voltage applying plates 38A and 38B has terminals thereon, and the terminals on first ends of the voltage applying plates 38A and 38B are connected to the aluminum bar 29, and the terminals on the other ends of the voltage applying plates 38A and 38B are connected to the positive electrode of the power supply 37. The aluminum bar 29 is welded to the anode lead lines 31 embedded in the respective anode elements 30, and electric current is sent to the respective anode elements 30 from the power supply 37 through the aluminum bar 29 and the voltage applying plates 38A, 38B.

As hereinabove described, according to the ninth embodiment of the present invention, the aluminum bar 29 is electrically connected to first ends of the two voltage applying plates 38A and 38B whose other ends are connected to the positive electrode of the power supply 37, making it possible to improve the reliability of the electrical connection between the aluminum bar 29 and the voltage applying plates and, hence, the anodization process can be performed more precisely.

Although the two voltage applying plates 38A and 38B are used in this embodiment, the number of the voltage applying plates may not be limited thereto. If more than two voltage applying plates are used, it is possible to obtain the above-described effect more stably.

Although the present invention has been described in connection with the preferred embodiments thereof with reference to the accompanying drawings, it is to be noted that various changes and modifications are apparent to those skilled in the art. Such changes and modifications are to be understood as included within the scope of the present invention as defined by the appended claims, unless they depart therefrom.

What is claimed is:

1. An apparatus for manufacturing a solid electrolytic capacitor, comprising:
   an anodization part for forming a dielectric oxide film on a surface of a porous anode element made of a valve action metal, the anode element having embedded therein an anode lead line with one end portion of the anode lead line exposed to an outside;
   a polymerization part for forming a solid electrolytic layer made of an electroconductive polymer on the dielectric oxide film by a chemical oxidation polymerization, and comprising a plurality of polymerization baths of a substantially same structure, and a conveyance mechanism, wherein the plurality of polymerization baths are placed around the conveyance mechanism within a conveyance range;
   a cathode layer formation part for forming a cathode layer on the solid electrolytic layer and providing a capacitor element;
   an assembly part for connecting the anode lead line with an anode terminal and connecting the cathode lead line with a cathode terminal, the anode and cathode terminals being for connecting with an outer circuit; and
   a molding part for covering the capacitor element with a covering resin with respective portions of the anode and cathode terminals exposed to an outside;
   wherein at least one of the polymerization baths comprises
     a first open-topped cavity to be filled with a polymerization solution,
     a supply passage for supplying the first open-topped cavity with the polymerization solution, the supply passage being placed at one end of a bottom surface of the first open-topped cavity and communicated with the first open-topped cavity,
     an interruptible jet plate for preventing a jet flow of the polymerization solution supplied through the supply passage and the interruptible jet plate being placed adjacent to a connection part of the supply passage and the first open-topped cavity.

a guide plate for restraining a rise of a level of the polymerization solution which is supplied to the first open-topped cavity via the interruptible jet plate and the guide plate being located from one end of the first open-topped cavity adjacent to the interruptible jet plate to a substantially center position of the first open-topped cavity, and a level controlling mechanism for controlling the level of the polymerization solution supplied into the first open-topped cavity at a predetermined amount.

2. An apparatus for manufacturing a solid electrolytic capacitor, according to claim 1, wherein the polymerization part includes a cleansing bath, and the cleansing bath and the plurality of the polymerization baths are formed of a substantially same structure.

3. An apparatus for manufacturing a solid electrolytic capacitor, according to claim 1, comprising a plurality of the polymerization parts.

4. An apparatus for manufacturing a solid electrolytic capacitor, according to claim 1, further comprising a solution-preparation part for supplying or recovering at least one of an anodization solution and a polymerization solution used in the anodization part and the polymerization part, respectively.

5. An apparatus for manufacturing a solid electrolytic capacitor, comprising:

an anodization part for forming a dielectric oxide film on a surface of a porous anode element made of a valve action metal, the anode element having embedded therein an anode lead line with one end portion of the anode lead line exposed to an outside;

a polymerization part for forming a solid electrolytic layer made of an electroconductive polymer on the dielectric oxide film by a chemical oxidation polymerization, and comprising a plurality of polymerization baths of a substantially same structure, and a conveyance mechanism, wherein the plurality of polymerization baths are placed around the conveyance mechanism within a conveyance range;

a cathode layer formation part for forming a cathode layer on the solid electrolytic layer and providing a capacitor element;

an assembly part for connecting the anode lead line with an anode terminal and connecting the cathode lead line with a cathode terminal, the anode and cathode terminals being for connecting with an outer circuit;

a molding part for covering the capacitor element with a covering resin with respective portions of the anode and cathode terminals exposed to an outside;

an inspection part for inspecting the capacitor element which is subjected to the molding part; and a packaging part for packaging the inspected capacitor element.

6. An apparatus for manufacturing a solid electrolytic capacitor, according to claim 1, wherein the at least one of the polymerization baths further comprises a second cavity below the first open-topped cavity and has a double-layered structure.

7. An apparatus for manufacturing a solid electrolytic capacitor, according to claim 1, wherein the supply passage has a net for reducing a bubble size placed adjacent to a connection part of the supply passage and the first open-topped cavity.

8. An apparatus for manufacturing a solid electrolytic capacitor, according to claim 1, wherein the guide plate has a trapezoid shape, and the guide plate has a first edge and a second edge which is parallel with and shorter than the first edge, and wherein the first edge is located at the one end of the first open-topped cavity adjacent to the interruptible jet plate and the second edge is located at the substantially center position of the first open-topped cavity.

9. An apparatus for manufacturing a solid electrolytic capacitor, according to claim 1, wherein the guide plate is located so that a height of the second edge is lower than that of the first edge.

10. An apparatus for manufacturing a solid electrolytic capacitor, according to claim 1, wherein the guide plate is bent so that the second edge is oriented downwards to face a bottom surface of the first open-topped cavity.

11. An apparatus for manufacturing a solid electrolytic capacitor, according to claim 1, wherein the level controlling mechanism comprises a weir board placed at a predetermined height of the first open-topped cavity.

12. An apparatus for manufacturing a solid electrolytic capacitor, according to claim 11, wherein the weir board is located substantially perpendicular to a depth direction of the first open-topped cavity, and wherein the weir board has an edge which the polymerization solution overflows, and the weir board has two or more notches on the edge thereof.

13. An apparatus for manufacturing a solid electrolytic capacitor, according to claim 1, wherein the level controlling mechanism includes a sensor placed at a predetermined height.

14. An apparatus for manufacturing a solid electrolytic capacitor, according to claim 1, wherein the first open-topped cavity has an adjustment screw of a horizontal level of the first open-topped cavity and the adjustment screw is located on an external wall of the first open-topped cavity.

15. An apparatus for manufacturing a solid electrolytic capacitor, according to claim 1, wherein at least one of the plurality of polymerization baths has an immersion mechanism for immersing the anode element into a polymerization solution in accordance with a rate of a capillary upward flow of the polymerization solution soaked into the anode element due to a capillary phenomenon.

16. An apparatus for manufacturing a solid electrolytic capacitor, according to claim 1, wherein the anodization part comprises an anodization bath having a cavity filled with an anodization solution and an immersion mechanism for immersing the anode element into the anodization solution in accordance with a rate of a capillary upward flow of the anodization solution soaked into the anode element due to a capillary phenomenon.

17. An apparatus for manufacturing a solid electrolytic capacitor, comprising:

an anodization part for forming a dielectric oxide film on a surface of a porous anode element made of a valve action metal, the anode element having embedded therein an anode lead line with one end portion of the anode lead line exposed to an outside;

a polymerization part for forming a solid electrolytic layer made of an electroconductive polymer on the dielectric oxide film by a chemical oxidation polymerization, and comprising a plurality of polymerization baths of a substantially same structure, and a conveyance mechanism, wherein the plurality of polymerization baths are placed around the conveyance mechanism within a conveyance range;

a cathode layer formation part for forming a cathode layer on the solid electrolytic layer and providing a capacitor element;

an assembly part for connecting the anode lead line with an anode terminal and connecting the cathode lead line with a cathode terminal, the anode and cathode terminals being for connecting with an outer circuit; and a molding part for covering the capacitor element with a covering resin with respective portions of the anode and cathode terminals exposed to an outside;

wherein at least one of the plurality of polymerization baths in the polymerization part has a thermocouple which is inserted from a bottom surface of the cavity toward a surface of the polymerization solution at a substantially center position of the cavity so that a temperature of the polymerization solution is controlled.

18. An apparatus for manufacturing a solid electrolytic capacitor, comprising:

an anodization part for forming a dielectric oxide film on a surface of a porous anode element made of a valve action metal, the anode element having embedded therein an anode lead line with one end portion of the anode lead line exposed to an outside;

a polymerization part for forming a solid electrolytic layer made of an electroconductive polymer on the dielectric oxide film by a chemical oxidation polymerization, and comprising a plurality of polymerization baths of a substantially same structure, and a conveyance mechanism, wherein the plurality of polymerization baths are placed around the conveyance mechanism within a conveyance range;

a cathode layer formation part for forming a cathode layer on the solid electrolytic layer and providing a capacitor element;

an assembly part for connecting the anode lead line with an anode terminal and connecting the cathode lead line with a cathode terminal, the anode and cathode terminals being for connecting with an outer circuit; and a molding part for covering the capacitor element with a covering resin with respective portions of the anode and cathode terminals exposed to an outside;

wherein the anodization part comprises an anodization bath having a cavity filled with an anodization solution and a thermocouple which is inserted from a bottom surface of the cavity toward a surface of an anodization solution at a substantially center position of the cavity so that a temperature of the anodization solution is controlled.

19. An apparatus for manufacturing a solid electrolytic capacitor, according to claim 1, wherein the anodization part comprises an anodization bath having:

a cavity filled with an anodization solution into which the anode element is immersed;

a power supply having a positive electrode; and two or more voltage applying plates for electrically connecting the positive electrode of the power supply and the anode element.

* * * * *